US007792983B2

(12) United States Patent
Mishra et al.

(10) Patent No.: US 7,792,983 B2
(45) Date of Patent: Sep. 7, 2010

(54) METHOD AND APPARATUS FOR CHECKPOINT AND RESTART OF PSEUDO TERMINALS

(75) Inventors: Rajeev Mishra, Bangalore (IN); Lance Warren Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 11/831,678

(22) Filed: Jul. 31, 2007

(65) Prior Publication Data

US 2009/0037550 A1 Feb. 5, 2009

(51) Int. Cl.
G06F 15/16 (2006.01)
(52) U.S. Cl. .................................................. 709/231
(58) Field of Classification Search ................. 709/227, 709/230, 231
See application file for complete search history.

(56) References Cited

U.S. PATENT DOCUMENTS

| | | | |
|---|---|---|---|
| 5,539,885 | A | 7/1996 | Ono et al. |
| 5,724,512 | A | 3/1998 | Winterbottom |
| 5,884,021 | A | 3/1999 | Hirayama et al. |
| 6,795,966 | B1 | 9/2004 | Lim et al. |
| 6,963,923 | B1 | 11/2005 | Bennett |
| 7,024,467 | B2 * | 4/2006 | Rosensteel et al. .......... 709/219 |
| 7,039,663 | B1 * | 5/2006 | Federwisch et al. ......... 707/205 |
| 7,076,555 | B1 * | 7/2006 | Orman et al. ............... 709/227 |
| 7,082,551 | B2 * | 7/2006 | Lawrance et al. ............ 714/13 |
| 7,099,866 | B1 | 8/2006 | Crosbie et al. |
| 7,272,654 | B1 | 9/2007 | Brendel |
| 7,505,410 | B2 * | 3/2009 | Lakshmanamurthy et al. .......................... 370/235 |
| 2004/0250124 | A1 | 12/2004 | Chesla et al. |
| 2005/0262411 | A1 | 11/2005 | Vertes et al. |
| 2005/0276548 | A1 | 12/2005 | Fu et al. |

(Continued)

FOREIGN PATENT DOCUMENTS

FR 2843210 6/2004

(Continued)

OTHER PUBLICATIONS

"A Checkpoint and Restart mechanism for parallel programming systems—Messages and Queues", Sameer Paranjpye, pp. 1-4, retrieved May 14, 2007 http://charm.cs.uiuc.edu/papers/SameerThesis.www/node13.html.

(Continued)

Primary Examiner—Phuoc Nguyen
(74) Attorney, Agent, or Firm—Yee & Associates, P.C.; Matthew W. Baca

(57) ABSTRACT

A computer implemented method, apparatus, and computer program product for restarting pseudo terminal streams. In one embodiment, a device associated with a file descriptor in a set of file descriptors is opened. The set of file descriptors are identified in checkpoint data for restarting the pseudo terminal streams. In response to identifying the device as a pseudo terminal slave device, an entry for the identified pseudo terminal slave device is added to a list of open pseudo terminal slave devices. The entry for the identified pseudo terminal slave device is marked as an open pseudo terminal slave device. The list of open pseudo terminal slave devices permit pseudo terminal master devices and pseudo terminal slave devices to be restored and restarted in random order during a restart of the pseudo terminal streams.

20 Claims, 10 Drawing Sheets

U.S. PATENT DOCUMENTS

| | | | |
|---|---|---|---|
| 2006/0041786 | A1 | 2/2006 | Janakiraman et al. |
| 2006/0184587 | A1* | 8/2006 | Federwisch et al. ......... 707/200 |
| 2007/0244962 | A1* | 10/2007 | Laadan et al. ............... 709/201 |

FOREIGN PATENT DOCUMENTS

| | | |
|---|---|---|
| FR | 2872605 | 6/2004 |
| WO | WO2004015513 | 2/2004 |
| WO | WO2006010812 | 2/2006 |

OTHER PUBLICATIONS

"Solaris Internals: Solaris 10 and OpenSolaris Kernel Architecture", Second Edition, retrieved Mar. 20, 2007 http://safari5.bvdep.com/0131482092/ch14lev1sec9.

"The Single UNIX Specification, Version 2, 1997", The Open Group, retrieved Mar. 20, 2007 http://opengroup.org/onlinepubs/007908799/xsh/fchdir.html.

Hutzelman, "[OpenAFS]MailDir & Coda/AFS was: Practical No. of files per dir was: [OpenAFS] Max number of files in volume?", retrieved Mar. 20, 2007 http://www.openafs.org/pipermail/openafs-info/2004-May/013499.html.

Ryabkov, "filesystem implementation questions", retrieved Mar. 20, 2007 http://lists.freebsd.org/pipermail/freebsd-hackers/2005-August/013133.html.

"Linux/Unix Information about the Linux/Unix chdir command" retrieved Mar. 20, 2007 http://www.computerhope.com/unix/uchdir.htm.

U.S. Appl. No. 11/751,482, filed May 21, 2007, Craft et al.

U.S. Appl. No. 11/751,505, filed May 21, 2007, Craft et al.

U.S. Appl. No. 11/751,455, filed May 21, 2007, Vishwanathan.

Krishnan et al., "Checkpoint and Restart for Distributed Components in XCAT3", Proceedings of the Fifth IEEE/ACM International Workshop on Grid Computing (GRID'04), 2004, pp. 281-288.

Sancho et al., "Current Practice and a Direction Forward in Checkpoint/Restart Implementations for Fault Tolerance", Proceedings of the 19th IEEE International Parallel and Distributed Processing Symposium (IPDP'05), Workshop 18, vol. 19, 2005, pp. 1-8.

Zhong et al., "CRAK: Linux Checkpoint/Restart As a Kernel Module", Network Computing Lab, Columbia University, Technical Report CUCS-014-01, Nov. 2001, pp. 1-19 http://www.ncl.cs.columbia.edu/research/migrate/crak.html.

USPTO office action for U.S. Appl. No. 11/751,482 dated Dec. 24, 2009.

USPTO final office action for U.S. Appl. No. 11/751,482 dated Jun. 11, 2010.

* cited by examiner

METHOD AND APPARATUS FOR CHECKPOINT AND RESTART OF PSEUDO TERMINALS

CROSS-REFERENCE TO RELATED APPLICATIONS

The present invention is related to the following application entitled Method and Apparatus for Checkpointing and Restarting a Stream in a Software Partition, application Ser. No. 11/751,505 (filed May 21, 2007) assigned to a common assignee and incorporated herein by reference.

BACKGROUND OF THE INVENTION

1. Field of the Invention

The present invention is related generally to a data processing system and in particular to a method and apparatus for the migration of a software partition. More particularly, the present invention is directed to a computer implemented method, apparatus, and computer usable program code for checkpointing and restarting stream based pseudo terminals.

2. Description of the Related Art

In a software partitioned environment, a single instance of the operating system can be partitioned into multiple virtual operating system environments. Each of these virtual operating system environments is known as a software partition. A software partition is a virtualized operating system environment within a single instance of the operating system. Software running within each software partition will appear to have its own separate instance of the operating system. A software partition may include one or more processes. An example of a software partition is AIX® workload partition (WPAR), which is a product available from International Business Machines (IBM®) Corporation.

Data processing systems frequently utilize data integrity operations to ensure that the state of data stored in memory may be recreated in the event of a failure. A checkpoint operation is a data integrity operation in which the application state and memory contents for an application running on the kernel are written to stable storage at particular time points to provide a basis upon which to recreate the state of an application in the event of a failure. The particular time point at which state and memory contents are written to stable storage may be referred to as a checkpoint.

Checkpoint data may be used to migrate or restore a software partition, including any processes running in the partition, from one computing device to another computing device, while processes are still running in the software partition. The computing devices may be a separate physical computing device or a separate logical computing device on the same physical machine. Migration of a software partition involves checkpointing the state of every process in the partition on one data processing system and then restoring the state of every process on another data processing system using the checkpoint data.

A pseudo terminal is a pseudo-device pair that provides a terminal interface without an associated computer terminal or other hardware. Instead, software replaces the role of the underlying hardware for the pseudo terminal session.

For each pseudo terminal, the operating system provides two devices: a master device (PTM) and a slave device (PTS). Data written to the master side is received by the slave side as if it was the result of a user typing at an ordinary terminal, and data written to the slave side is sent to the master side as if it was written on an ordinary terminal. In this way, the process manipulating the master side of the pseudo-terminal has control over the information read and written on the slave side, as if it were manipulating the keyboard and reading the screen on a real terminal. When employed over the network the master side of the pseudo-terminal is connected to a socket enabling the remote user's keyboard input to manipulate the local process connected to the slave device and creating remote login capabilities.

Currently, if a user is logged in to an application associated with a pseudo terminal, such as a remote login (rlogin), telnet, emacs, or xterm on X Windows, the application cannot be checkpointed and restored unless the user first logs out of the application. In other words, the user must end their login session and disrupt the user's utilization of the application before the application can be moved to a different application server or restored. This is an inefficient process that can also be annoying and inconvenient to the user.

SUMMARY OF THE INVENTION

The illustrative embodiments provide a computer implemented method, apparatus, and computer usable program code for checkpoint and restart of pseudo terminal streams. In one embodiment, a device associated with a file descriptor in a set of file descriptors is opened. The set of file descriptors are identified in checkpoint data for restarting the pseudo terminal streams. In response to identifying the device as a pseudo terminal slave device, an entry for the identified pseudo terminal slave device is added to a list of open pseudo terminal slave devices. The entry for the identified pseudo terminal slave device is marked as an open pseudo terminal slave device. The list of open pseudo terminal slave devices is used for restoring pseudo terminal master devices and pseudo terminal slave devices associated with the pseudo terminal streams in a random order.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
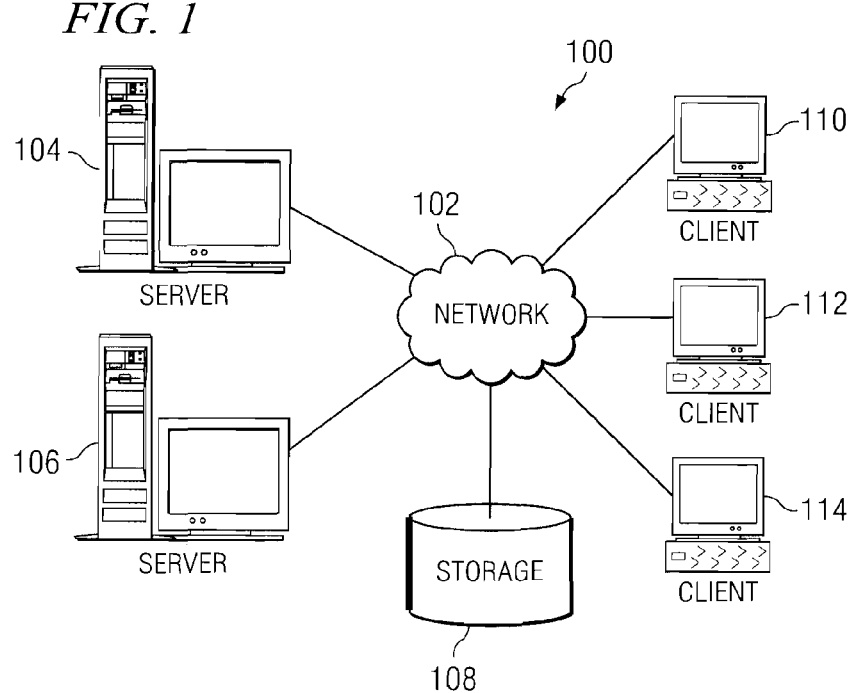
FIG. 1 is a pictorial representation of a network of data processing systems in which illustrative embodiments may be implemented.
Figure 2:
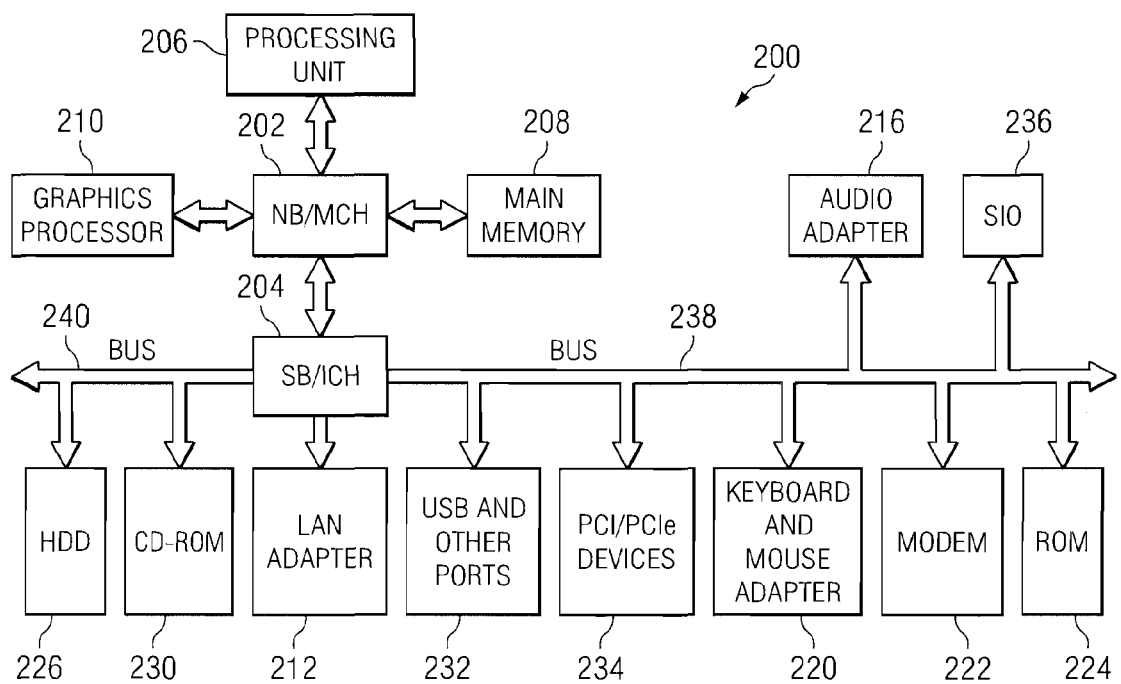
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In this example, server 104 and server 108 support a software partitioned environment.

In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 may also include software partitions. Clients 110, 112, and 114 are clients to server 104 in this example. Network data processing system 100 may include additional servers, clients, and other devices not shown.

In this example, server 104 supports a software partition having one or more applications running in the software partition. A software partition and all processes running in the software partition are being migrated to client 110. In one embodiment, prior to migration of the software partition, a checkpoint controller initiates the gathering and saving of checkpoint data regarding the state of all applications running in the software partition being migrated. The checkpoint data is saved to state files on any type of storage device, such as storage unit 108.

In another embodiment, checkpoint data is not saved to state files on storage 108. Instead, a departure server, such as server 104, transmits the checkpoint data directly to an arrival server, such as server 102. An arrival server is the server onto which the migrating software partition is moved. In other words, during migration of a software partition, the software partition is migrated or moved from a departure server to an arrival server. In this case, the checkpoint data is never saved on storage unit 108 and/or is saved on storage unit 108 after or in conjunction with transmitting the checkpoint data to server 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Moreover, the illustrative embodiments do not require network 102. In one embodiment, the processes running in one software partition are moved to a software partition on the same physical computing device without requiring a network connection. In this example, the departure server and the arrival server are software servers supporting software partitions on the same physical computing device, such as server 106. Thus, a software partition can be moved from a departure server on server 106 to a software partition on an arrival server that is also implemented on server 106.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments. Data processing system 200 supports a software partitioned environment that includes one or more software partitions. Data processing system 200 may be an arrival server, a departure server, or both a departure server and an arrival server.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/

PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A software partition is a virtualized operating system environment within a single instance of the operating system. A single instance of the operating system can be partitioned into multiple virtual operating system environments. Each of these virtual operating system environments is known as a software partition. An example of a software partition is AIX® workload partition (WPAR), which is a product available from International Business Machines (IBM®) Corporation.

Software running within each software partition will appear to have its own separate instance of the operating system. A software partition may include one or more processes. Processes in one software partition are completely isolated from processes in other software partitions on the same data processing system. They are not allowed to interact with processes in other software partitions.

A software partition, including any processes running in the partition, may be migrated from one physical computing device to another physical or logical computing device while still active. The processes and/or other content of a software partition may also be migrated into another software partition on the same physical computing device.

Migration of a software partition involves checkpointing the state of every process in the partition on a first data processing system and then restoring the state of every process on a second partition using the checkpoint data. As used herein, the second partition may be a different partition located on the first data processing system or a different partition located on a different data processing system than the first data processing system.

A checkpoint operation is a data integrity operation in which the application state and memory contents for an application are written to stable storage at a particular time to provide a basis upon which to recreate the state of an application and/or processes running in a software partition, such as when a software partition is migrated from one computing device to another computing device. The computing device may be a different physical computing device or a different logical computing device. The process by which the state and memory contents are written to stable storage may be referred to as a checkpoint.

When a software partition is migrated from a departure server to an arrival server, a checkpoint operation is performed to obtain and store information regarding applications and/or processes running in the software partition. The state data may be saved into a state file on a local data storage device or on a remote data storage device, such as, but not limited to, a local hard disk, a network disk, a flash memory, a tape drive, a nonvolatile random access memory (NVRAM), or any other type of data storage device. Checkpoint operations are performed at various pre-defined points in time or user instigated points in time to generate checkpoint data.

The checkpoint data is utilized to recreate/restore the state of all processes running in the departure software partition at the last checkpoint into a new arrival software partition. A departure software partition is a software partition on a computing device that is being migrated to a different computing device and/or a different software partition on the same computing device. The arrival software partition is a different software partition than the departure software partition. The processes running in the departure software partition are restored or restarted on the arrival software partition.

A pseudo terminal is a virtual device that provides a text terminal interface without the associated physical computer terminal. Instead, the pseudo terminal provides a software process that performs the role of the underlying hardware for the pseudo terminal session. In other words, a pseudo terminal simulates an ordinary computer terminal without the associated hardware. A pseudo terminal may also be referred to as a pseudo terminal teletype (tty) or a pseudo tty. A pseudo terminal having stream architecture is implemented as a set of modules in the kernel that transfer messages between the user application and the pseudo terminal device by passing messages in a chain from one module to another. The set of modules in the kernel are also referred to herein as a set of kernel modules. The set of kernel modules includes a single module, as well as two or more modules. A module is a software component that may perform a particular function with regard to data that is received by the module or sent from the module to the application, the device, or another module in the chain. A pseudo terminal having stream architecture is discussed in greater detail in FIG. 4 below.

When employed over a network, the master side of the pseudo-terminal is connected to a socket enabling the remote user's keyboard input to manipulate the local process connected to the slave device and creating remote login capabilities. A socket is a network connection between a local and remote computer. Thus for checkpoint and restart there are three distinct entities whose state must be saved and restored. These entities are the master device, the slave device, and any socket that may be present.

Because there may be hundreds of pseudo terminals on a computer system, the entities must be matched properly. The master device must be matched with the correct slave device and the socket matched with the correct master/slave device pair. The illustrative embodiments recognize that this creates special problems for mobility of pseudo terminals because, in restart, the master and slave devices are created and sockets restored in random order.

In other words, the embodiments recognize that when creating a pseudo terminal during normal operation, the operating system forces applications to create the pseudo terminal in a set order. This order requires that the master device be opened, then the slave device is opened. Next, the socket, if any, is opened. Finally, the operating system connects the socket to the master/slave pair. On restart, after moving a software partition, the order in which the devices are opened cannot be guaranteed. For example, the socket may be opened first, followed by the slave, followed by the master, and so on. This random order of restoring the pseudo terminal device may lead to incorrectly pairing master and slave devices, failing to pair master and slave devices, and other problems that would inhibit or prevent mobility of the pseudo terminal.

The illustrative embodiments recognize that currently available checkpoint and restart processes require a user that is logged in to an application service associated with a pseudo terminal to log off and/or terminate the session before the checkpoint or restart operation can be performed. Therefore, the illustrative embodiments provide a computer implemented method, apparatus, and computer usable program code for checkpoint and restarting pseudo terminals in a software partitioned environment that permit pseudo terminal devices to be restarted in a random order and without requiring a user to logoff before performing the checkpoint and restart.

In one embodiment, a device associated with a file descriptor in a set of file descriptors is opened. The set of file descriptors are identified in checkpoint data for restarting the pseudo terminal streams. In response to identifying the device as a pseudo terminal slave device, an entry for the identified pseudo terminal slave device is added to a list of open pseudo terminal slave devices. The list of open pseudo terminal slave devices is a queue for slave devices that are waiting for a corresponding master device to be opened. When the corresponding master device is opened, the master device removes the slave device from the wait queue. In this manner, slave devices can be opened before the corresponding master device is opened by placing the slave devices in a wait queue.

The entry for the identified pseudo terminal slave device is marked as an open pseudo terminal slave device. As discussed above, in some systems, a given slave device is only opened after other slave devices having a lesser minor number are already opened. In other words, slave device one is opened before slave device two. If a set of unopened pseudo terminal slave devices are designated to be opened before the identified pseudo terminal slave device that has already been opened, the process creates a set of dummy entries in the list of open pseudo terminal slave devices. Each dummy entry represents an unopened pseudo terminal slave device in the set of unopened pseudo terminal slave devices. The dummy entries act as place holders in the list of open pseudo terminal slave devices and are marked in the list as being unopened slave devices. In this manner, if a slave device two is opened before a slave device one, a dummy entry is created in the list of open pseudo terminal slave devices for slave device one and the dummy entry is marked "not open." A real entry can then be created for open slave device two.

This utilization of dummy entries or placeholders in the wait queue for slave devices that are waiting for corresponding master devices to be opened allows slave devices to be opened in a random order. In other words, the list of open pseudo terminal slave devices is used for restoring pseudo terminal master devices and pseudo terminal slave devices associated with the pseudo terminal streams in a random order without disrupting execution of an application associated with a pseudo terminal master and pseudo terminal slave pair in the pseudo terminal streams being restored. Thus, a slave can be opened before a master and a given slave can be opened before one or more other slaves device that are designated to be opened before the given slave device without disrupting execution of the user's login session and/or without incorrectly pairing the master devices and slave devices associated with pseudo terminal streams.

A user is not required to log off of an application before the application can be checkpointed on a departure server and restored on an arrival server. Moreover, the user is not required to log back in to the application after the restore/restart is complete.

In another embodiment, a computer implemented method, apparatus, and computer usable program code is provided for checkpoint and restart of pseudo terminal streams. The process saves open file descriptors associated with pseudo terminal streams to form a list of open file descriptors. The stream comprises a pseudo terminal master device, a pseudo terminal slave device, and a set of modules. The process freezes the pseudo terminal stream to prevent any module in the set of modules from sending any messages, other than a checkpoint message, to another module in the set of modules. The checkpoint message comprises a message block for each module in the set of modules. Each message block in the checkpoint message is updated with internal data to form a restart message. The internal data is data describing an internal state of a module.

In another embodiment, in response to a determination that a file descriptor in the list of open file descriptors is associated with a socket, the process uses network services to obtain checkpoint data describing a state of the socket. The process allocates a buffer to hold checkpoint data for the pseudo terminal stream. The process saves the checkpoint data to the buffer. The checkpoint data includes the internal data for each module in the set of modules, external data for each module in the set of modules, and messages on a read and write queue associated with the set of modules.

Figure 3:
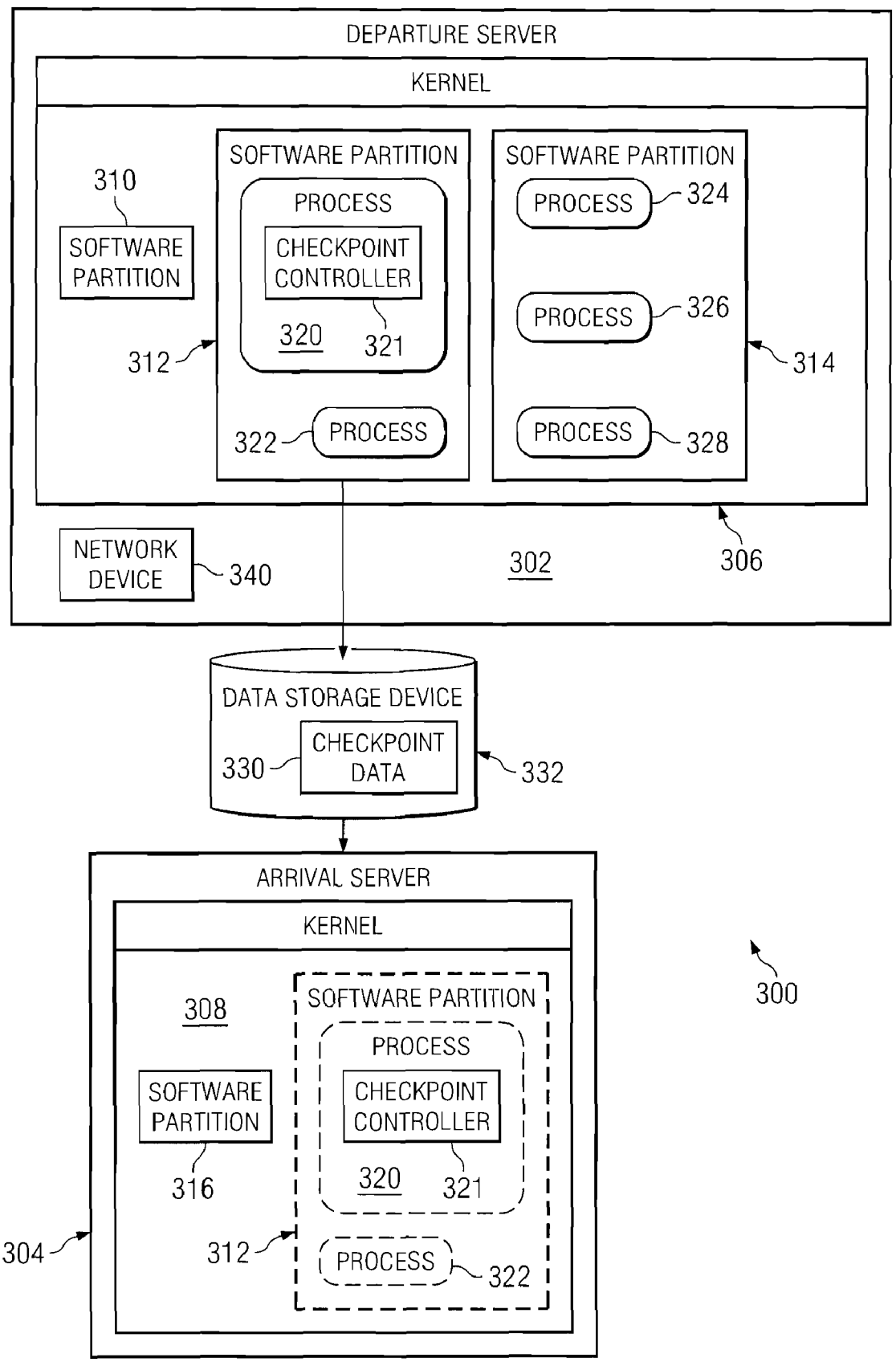
FIG. 3 is a block diagram illustrating the checkpoint procedure during the migration of a software partition in accordance with an illustrative embodiment.

FIG. 3 is a block diagram illustrating a checkpoint procedure during the migration of a software partition in accordance with an illustrative embodiment. Data processing system 300 may be implemented in any type of network data processing system, including, without limitation, data processing system 100 in FIG. 1.

Departure server 302 and arrival server 304 are computing devices that support a software partitioned environment. Departure server 302 is the server on which the software partition is located before migration. Arrival server 304 is the server on which the software partition is located after migration. When a software partition is migrated, it "departs" from departure server 302 and "arrives" on arrival server 304.

The software partition on departure server 302 may be referred to as a first software partition or a departure software partition. The software partition on arrival server 304 after migration of the software partition to arrival server 304 may be referred to as a second software partition or an arrival software partition. Departure server 302 and arrival server 304 may be implemented in any type of computing device supporting a software partitioned environment, such as, but not limited to, server 104 or client 110 in FIG. 1.

Kernel 306 and kernel 308 are software processes for managing resources on data processing system 300, such as, without limitation, processor resources, input and output (I/O) resources, and memory resources on a computing device. In other words, kernel 306 is an abstraction layer between hardware and software on departure server 302 and kernel 308 is an abstraction layer between hardware and software on departure server 302.

Departure server 302 includes one or more software partitions for partitioning the operating system image within kernel 306 into multiple virtual operating system instances. In this example, departure server 302 includes software partitions 310-314. Arrival server 304 includes software partition 316. However, a server, such as departure server 302, is not limited to three software partitions. In accordance with the illustrative embodiments, a computing device, such as departure server 302 or arrival server 304, may include two software partitions, four software partitions, or any other number of software partitions in accordance with the illustrative embodiments.

Each software partition may include one or more processes. A process is an executing instance of a computer program or application, a task, or an operation being performed on data. In other words, a process executes the instructions in a computer program. A process may include, but is not limited to, an executing instance of remote login (rlogin), telnet, xterm running on X Windows, a remote email service, an online video game application, or any other application associated with a pseudo terminal or a terminal emulator. Telnet applications are software applications that utilize teletype network (telnet) protocols for remote access to servers. In this example, software partition 312 includes processes 320-322 and software partition 314 includes processes 324-328.

Software partition 312 is being migrated from departure server 302 to arrival server 304. A checkpoint controller is associated with each process running on software partition 312. A checkpoint controller is a software component of a given process that gathers process state data, data regarding open files and open sockets bound to the process, the state of streams associated with the process, the state of in-flight files associated with the process, and any other information regarding the current state of a process in software partition 312. The checkpoint data may then be used to recreate or re-establish each process running in software partition 312 to the same state that existed at the time the checkpoint controller gathered the checkpoint data. The time a checkpoint controller gathers checkpoint data is referred to as a checkpoint time.

For example, checkpoint controller 321 associated with process 320 saves state data for process 320. Another checkpoint controller (not shown) associated with process 322 saves state data associated with process 322 to a state file. The state data for processes 320-322 form checkpoint data 330. Checkpoint data 330 is utilized to restore or restart processes 320-322 on arrival server 304 in the same state that processes 320-322 were in on departure server 302 at the time checkpoint data 330 was last saved.

Checkpoint data 330 is a set of state files on data storage device 332 for storing state data regarding processes running on a software partition. The state of each process in a software partition can be stored in one state file. In this example, if a software partition had ten processes running on the software partition, checkpoint data 330 would contain ten state files. Checkpoint data 330 stores checkpoint state data for processes 320-322 running in software partition 312 to state files on data storage device 332 to form checkpoint data 330. In this example, checkpoint data 330 stores state information for software partition 312. However, checkpoint data 330 may include state files for multiple software partitions, rather than only a single software partition.

Checkpoint data 330 is stored in data storage device 332. Data storage device 332 is any type of known or available device for storing data, including, without limitation, a hard disk, a compact disk (CD), a compact disk rewrite-able (CD-RW), a compact disk read-only memory (CD-ROM), a non-volatile random access memory (NV-RAM), a flash memory, or any other type of data storage device. Data storage device 332 may be located locally to departure server 302, locally to arrival server 304, remotely to departure server 302, and/or remotely to arrival server 304.

In this example, data storage device 332 is located remotely to departure server 302. In other words, data storage device 332 is implemented using one or more network data storage devices that are accessible to departure server 302 and/or arrival server 304 via a network connection, such as network 102 in FIG. 1. For example, data storage device 332 may include one or more remote data storage devices, such as storage unit 108 in FIG. 1. A network connection may be enabled via a network device associated with departure server 302 and/or arrival server 304.

A network device (not shown) is any type of known or available network access software for allowing a computing device to access a network. The network device connects to a network connection. The network connection permits access to any type of network. For example, a network may include, but is not limited to, a local area network (LAN), a wide area network (WAN), the Internet, an intranet, an Ethernet, a wireless network, or any other type of network.

In another embodiment, data storage device 332 is located locally to departure server 302. Data stored in data storage device 332 is shared or made accessible to arrival server 304 using protocols, such as file transfer protocols (FTP), and/or any other protocols for accessing data in a remote data storage device.

In this example, data storage device 332 is a single data storage device. However, in accordance with the illustrative embodiments, data storage device 332 may include two or more data storage devices. For example, data storage device 332 may include, but is not limited to, any combination of a local hard disk, a local non-volatile random access memory, and/or a remote hard disk that is accessible to arrival server 304 over a network connection.

If a user wants to migrate software partition 312 from departure node 302 to arrival node 304, a checkpoint controller associated with each process running on software partition 312 first saves checkpoint data 330 for each process and any device, such as, without limitation, a terminal or pseudo terminal, being utilized by a process to data storage device 332.

Checkpoint controller 321 is a software component for a given process that gathers checkpoint data, data regarding open files and open sockets bound to the process, and any other information regarding the current state of a process in software partition 312. Checkpoint data 330 may then be used to recreate or re-establish each process running in software partition 312 to the same state that existed at the time the checkpoint controller gathered the checkpoint data.

The illustrative embodiments recognize that the modules in a pseudo terminal stream are constantly sending messages back and forth between the modules in the chain of modules. After a module sends a message to an intended recipient module in the chain but before the message reaches the intended recipient, the message is an in-flight message. Therefore, the checkpoint controller of the illustrative embodiments gathers checkpoint data for internal state of all stream modules and the state of all in-flight messages associated with the pseudo terminal stream.

Figure 4:
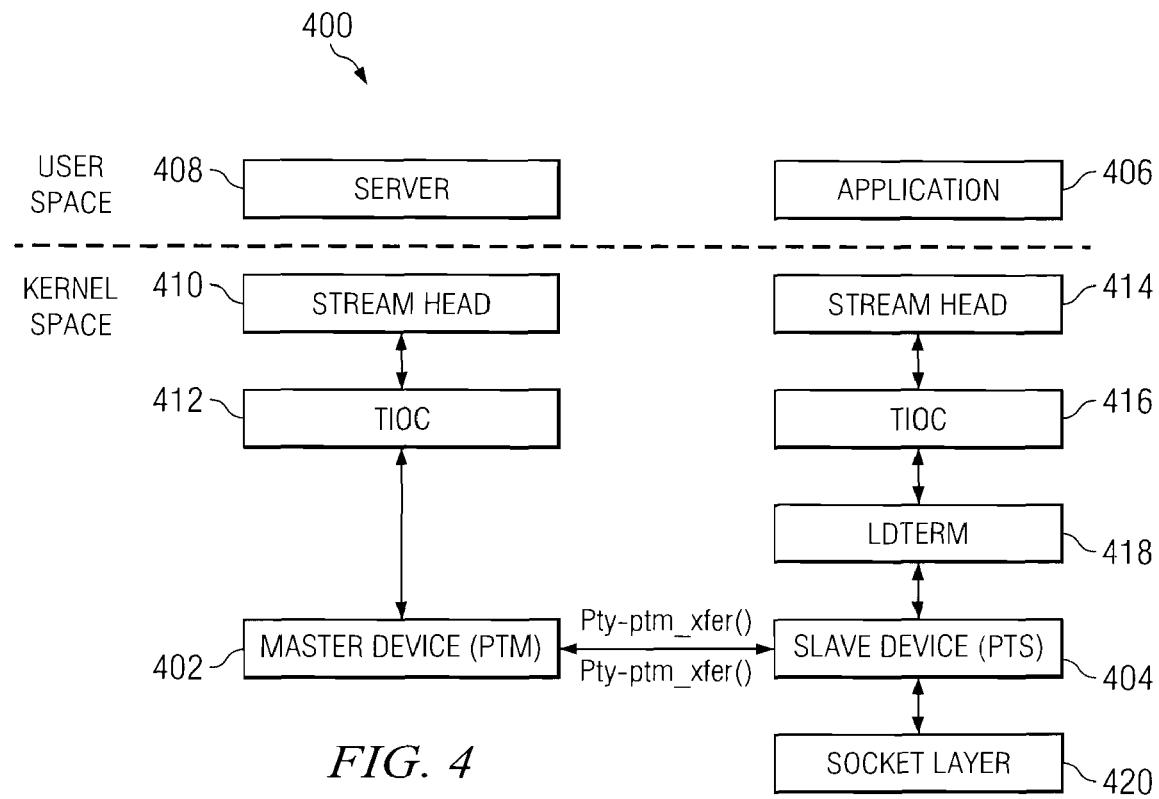
FIG. 4 is a block diagram illustrating a stream architecture pseudo terminal device in accordance with an illustrative embodiment.

Turning now to FIG. 4, a block diagram illustrating a stream architecture pseudo terminal is shown in accordance with an illustrative embodiment. Pseudo terminal stream 400 may be implemented as any type of stream architecture pseudo terminal. Pseudo terminal stream is a stream architecture used by applications to communicate and interact with devices. A pseudo terminal stream is similar to an application programming interface in that it is an interface between an application and a terminal device.

A pseudo terminal device has two parts, master device (PTM) 402 and slave device (PTS) 404. Master device 402 and slave device 404 are a matched pair. In other words, master device 402 corresponds to a particular slave device. Likewise, slave device 404 is associated with or corresponds to a particular master device. It is important to maintain the correct pairing of master device 402 and slave device 404 during migration of application 406 in order to maintain the correct association of application 406 with the correct terminal device for display of data associated with application 406 to the user. Master device 402 and slave device 404 communicate with each other. Anything written on master device 402 is provided to slave device 404 as input. Anything written on slave device 404 is provided as input to master device 402.

Application 406 is an application running on a software partition, such as process 320 in FIG. 3, in user space. Application may be any type of application associated with a pseudo terminal, such as, but not limited to, a remote log in (rlogin) application, an X windows application, a telnet application, a terminal emulator, or any other type of login application associated with a stream based pseudo terminal.

Server 408 may be implemented in any type of computing device, such as, without limitation, server 104 in FIG. 1. In one embodiment, an application remotely logged in to server 408 can be moved to a different server without requiring the user to log-out prior to moving the application to the new server and then requiring the user to log back in to the new server. Thus, the process makes the procedure of moving and restarting the application to a new software partition transparent to the user.

Stream head 410 is a first software module in the stream associated with master device 402. Stream head 410 receives data or a message from server 408. Stream head 410 also transmits data and/or messages to server 408.

Terminal input/output coordinator (tioc) 412 and 416 is a terminal protocol that is used to control the interface, refresh screens associated with the terminals, and/or otherwise coordinate input and output associated with one or more terminals in the pseudo terminal.

Stream head 414 is a first software module in the steam associated with slave device 404. Stream head 414 receives data and/or messages from application 406 and transmits or sends data and/or messages to application 406. Line discipline (ldterm) 418 is a module for performing the standard terminal input/output processing.

Socket layer 420 is a layer for sockets, such as Internet sockets. A socket is a communication end point for a computing device communicating over a network. An operating system combines sockets with application 406 and a transport protocol to communicate with server 408.

Socket layer 420 is utilized in instances where pseudo terminal master 402 communicates with pseudo terminal slave 404 over a network. For example, if the pseudo terminal stream associated with master device 402 is located on a first physical computing device and the pseudo terminal stream associated with slave device 404 is located on a second physical computing device that is different or separate from the first computing device, the pseudo terminal streams communicate over a network connection. Sockets associated with socket layer 420 are utilized to enable the network connection between master device 402 and slave device 404.

During a checkpoint and restart operation, socket layer 420 and any associated sockets are checkpointed and restarted on the arrival server.

When application 406 wants a pseudo terminal associated with application 406 to perform a function, application 406 sends a message or data to stream head 414. Stream head 414 then sends the message down a chain of modules associated with pseudo terminal streams 400 to slave device 404. Slave device 404 transmits the message to master device 402 of the pseudo terminal device.

Master device 402 transmits data associated with the message up the stream of modules to stream head 410. Stream head 410 then communicates the message to one or more hardware or software devices, such as a physical terminal device, associated with server 408.

Pseudo terminal streams 400 may include any number of modules in the chain of modules. In addition, each module in pseudo terminal streams 400 has a state. Information regarding the state of each module in the chain is referred to as state data.

During a checkpoint, a checkpoint controller for application 406 gathers state information regarding the internal state of each module in pseudo terminal streams 400. Currently available checkpoint processes are not able to gather checkpoint data if a user is logged on to an application running on a software partition. The checkpoint cannot gather checkpoint data for the pseudo terminal until the user logs off of the application. However, the illustrative embodiments provide a checkpoint that saves checkpoint information regarding the internal state of a pseudo terminal stream for use in migrating a software partition even when a user is logged in to an application running on the software partition.

The checkpoint saves the checkpoint information in a state file as checkpoint data 330 in FIG. 3 for use in restoring each module and the internal state of each module in the stream during a restore operation. The checkpoint must also save state data regarding the external state of each module. The external state of a module is information regarding the state of "in-flight" messages that have been sent by a module but not yet received by the intended recipient. In other words, when a module sends a message to another module, the module passes the message to the operating system. The operating system then delivers the message to the intended recipient module.

While the operating system has the message, the message is an in-flight message. For example, when stream head 402 sends data in a message to module 408 but before the message is received by module 408, the data is an in-flight message. Likewise, if data has been generated for display by a terminal but the data is still in a queue and has not yet been transmitted to the terminal for display, the data is also "in-flight" data. Therefore, the checkpoint must initiate a process to gather both internal data for each module in pseudo terminal streams 400 and external data for any in-flight messages sent by modules in pseudo terminal streams 400. In this manner, the state data saved in the state file in accordance with the illustrative embodiments includes state information for messages sent, received, and messages in transit between modules.

The stream described in FIG. 4 is not limited to a stream having only those modules shown in pseudo terminal streams 400. Pseudo terminal streams 400 may include additional modules not shown in FIG. 4. In addition, pseudo terminal streams 400 may not include all of the modules shown in FIG. 4. In other words, pseudo terminal streams 400 is not limited to the modules shown in FIG. 4 and may include any number of modules and any type of modules in the stream.

A file descriptor is a descriptor or key for accessing a file or data structure. Pseudo terminal components are accessed using file descriptors from the user space. File descriptor information associated with the pseudo terminal is also required for restart. A file descriptor enables a process to write to a device associated with the file descriptor, read from the device associated with the file descriptor, and/or send control messages to the device associated with the file descriptor. Thus, a pseudo terminal slave device can use a file descriptor to communicate with a master device over a network.

Figure 5:
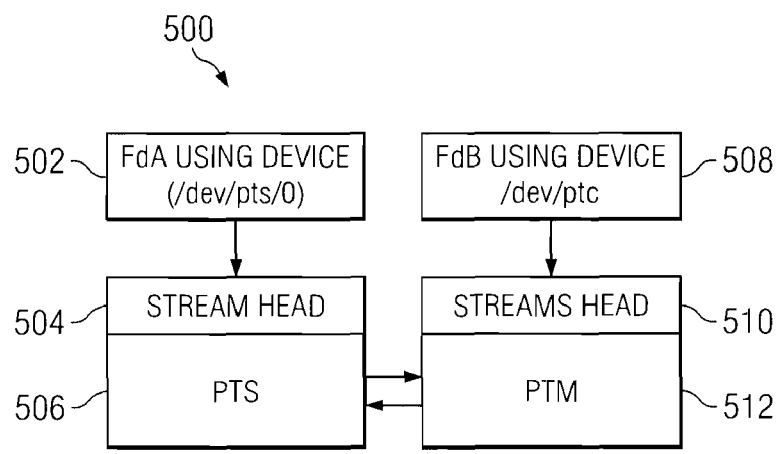
FIG. 5 is a block diagram of a pseudo terminal stream in a single computing device in accordance with an illustrative embodiment.

Referring to FIG. 5, a block diagram of a pseudo terminal stream in a single computing device is depicted in accordance with an illustrative embodiment. Pseudo terminal streams 500 is a stream based pseudo terminal architecture, such as, but not limited to, pseudo terminal streams 400 in FIG. 4.

File descriptor FdA 502 is the file descriptor 5associated with pseudo terminal slave device 506. File descriptor FdB 508 is associated with pseudo terminal master device 512. In this example, pseudo terminal slave device 506 and pseudo terminal master device 512 are located on the same physical computing device. Therefore, a network connection is not required to permit pseudo terminal slave device 506 and pseudo terminal master device 512 to communicate with each other.

Figure 6:
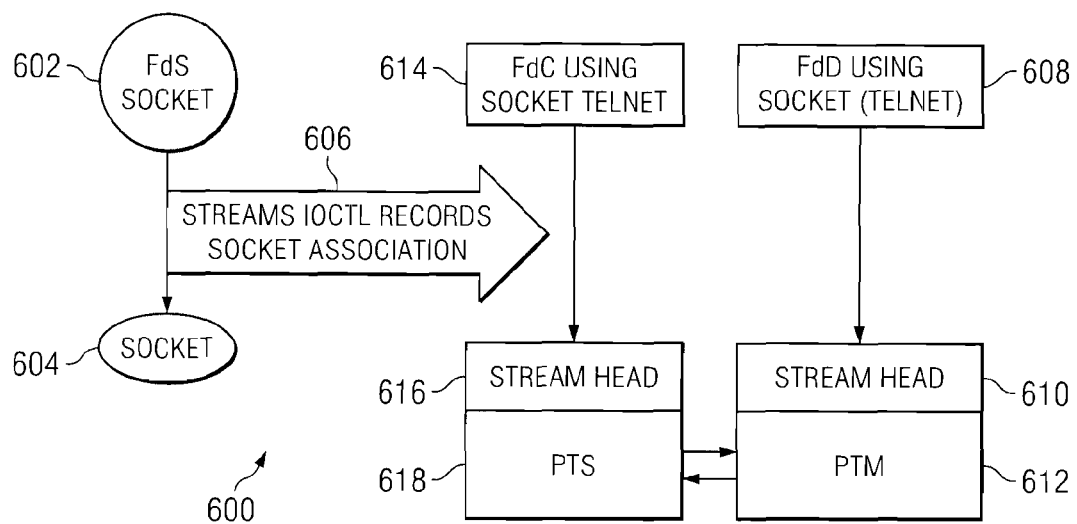
FIG. 6 is a block diagram of a pseudo terminal stream associated with two computing devices connected over a network connection in accordance with an illustrative embodiment.

Turning now to FIG. 6, a block diagram of a pseudo terminal stream associated with two computing devices connected over a network connection is shown in accordance with an illustrative embodiment. Pseudo terminal streams 600 is a stream based pseudo terminal architecture, such as, but not limited to, pseudo terminal streams 400 in FIG. 4.

Pseudo terminal streams 600 is a stream architecture for a pseudo terminal connected over a network, such as, without limitation, the Internet. In this example, a user is logged in to a telnet application associated with the pseudo terminal. FdS 602 is a file descriptor for the open network socket that is utilized to establish the network connection. The open network socket, socket 604, is a socket associated with an Internet connection. A special input/output control (ioctl) call 606 is used to record the association of the pseudo terminal with socket 604. File descriptor FdC is a file descriptor associated with stream head 610 and pseudo terminal master device 612. File descriptor FdD 614 is returned when stream head 616 and pseudo terminal slave device 618 are opened.

For example, if a user logs into an application associated with a telnet session and a pseudo terminal, pseudo terminal slave device 618 located on one physical computing device and pseudo terminal master device 612 located on a different physical computing device, utilize socket 604 to enable a network connection between pseudo terminal master device 612 and pseudo terminal slave device 618. During a checkpoint operation, the checkpoint controller saves the file descriptor identifying the open network socket, FdS socket 602, file descriptor FdC 608 associated with the pseudo terminal master device 612, and file descriptor FdD 614 associated with pseudo terminal slave device 618 as checkpoint data. This checkpoint data is used during a restart or restore operation to recreate pseudo terminal stream 600 and associated socket 604 on a new software partition.

The file descriptor FdS 602 associated with the socket is required for the checkpoint and restart of FdC 608 and FdD 614. Applications such as, without limitation, telnet and rlogin use sockets associated with a pseudo terminal to enable a remote user access to application services. Network checkpoint and restart services provide a socket checkpoint and restart interface.

During a checkpoint operation, a checkpoint controller associated with the departure server saves the file descriptor data associated with pseudo terminal stream 600. In this example, the file descriptor data includes FdS 602 associated with socket 604, FdC 608 associated with pseudo terminal master device 612, and FdD 614 associated with pseudo terminal slave device 618. The checkpoint controller uses network services to checkpoint socket 604 associated with file descriptor FdS 602.

The checkpoint controller generates a checkpoint message and sends the checkpoint message to stream head 610 and/or stream head 616. A checkpoint message is a message block for gathering checkpoint data describing the internal state and external state of pseudo terminal stream 600. A checkpoint message is described in greater detail in FIG. 7 below.

Stream head 610 passes the checkpoint message down stream to pseudo terminal master device 612. When pseudo terminal master 612 receives the checkpoint message, pseudo terminal master 612 updates the checkpoint header.

Likewise, stream head 616 passes a checkpoint message downstream to pseudo terminal slave device 618. When pseudo terminal slave device 618 receives the checkpoint message, the pseudo terminal slave device 618 updates the checkpoint header to indicate the status of the checkpoint process and update other information regarding the checkpoint.

The checkpoint process allocates a buffer to hold the internal information for pseudo terminal master device 612 and pseudo terminal slave device 618. The queue is a queue associated with the pseudo terminal. Any data generated by the pseudo terminal that has not yet been displayed to the user or data that has been transmitted but not yet received is stored in the queue. The queue is located in the kernel space. The checkpoint process copies queue internal data into the buffer. Queue internal data includes, but is not limited to, pty state flag, slave minor number, terminal display data, and any other internal state information and/or data stored in the queue.

The checkpoint controller allocates a buffer to store external data associated with pseudo terminal stream 600. External data is "in-flight" data that has been transmitted to a module in the stream but not yet received by the module. The "in-flight" data is held by the operating system pending delivery of the data to the intended recipient. The checkpoint controller copies the messages on the read and write queue associated with pseudo terminal stream 600 to the above allocated buffer. The checkpoint controller sends an acknowledge signal to stream head 610 and 616 for the checkpoint message.

Figure 7:
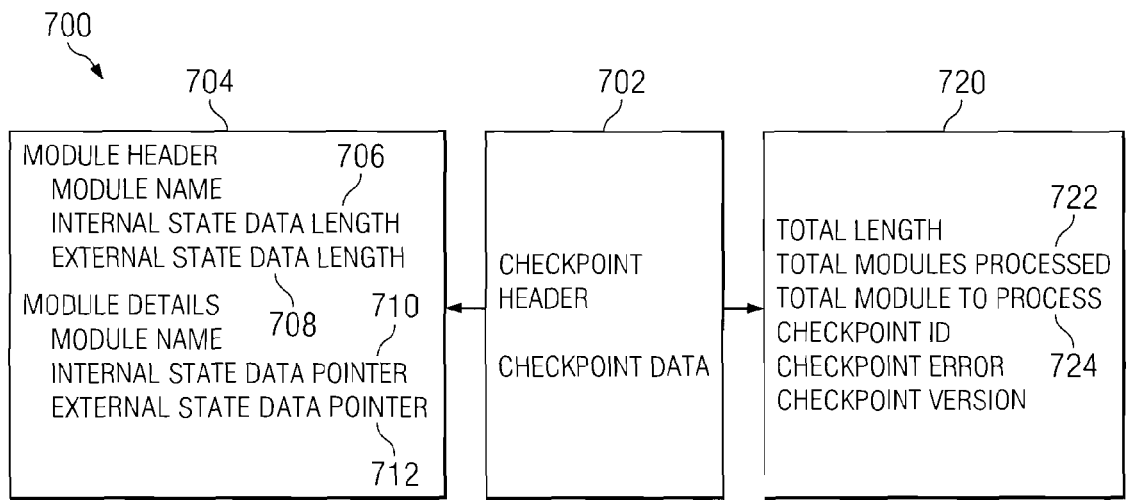
FIG. 7 is a block diagram illustrating a checkpoint/restart message in accordance with an illustrative embodiment.

FIG. 7 is a block diagram illustrating a checkpoint/restart message in accordance with an illustrative embodiment. Checkpoint message 700 is a message allocated by a stream header module, such as stream head 410 or 412 in FIG. 4. Checkpoint message 700 includes checkpoint header block 702. Checkpoint header block 702 provides checkpoint data gathered during the checkpoint operation.

Checkpoint message 700 also includes a message block for each module in the stream, such as message block 704. In other words, a checkpoint message for the stream associated with master device 402 in pseudo terminal streams 400 in FIG. 4 includes a message block for stream head 410, tioc 412, master device 402, slave device 404, ldterm 418, tioc 416, and stream head 414 for a total of seven message blocks.

In this example, message block 704 includes a module header. The module header provides information regarding a particular module for which message block 704 is allocated. The module header includes, but is not limited to, a name of the module, internal state data length 706 and external state data length 708. Internal state data is data regarding the internal state of a particular module. External state data is data regarding in-flight data generated by the module.

Checkpoint message 700 includes module details for the module for which message block 704 is allocated. Module details may include, without limitation, the module name, a pointer to internal state data 710, and a pointer to external state data. The module for which message block 704 is allocated saves internal state data in the message block. The operating system saves data regarding in-flight messages for the module to form external data.

Checkpoint message 700 also includes status message block 720. Status message block 720 includes data describing the status of checkpoint message 700. For example, status message block 720 may include, without limitation, the total length of checkpoint message 700, the total number of modules processed thus far 722, the total number of modules to be processed before the checkpoint controller will be complete 724, a checkpoint identifier, data regarding any checkpoint errors, and/or the checkpoint version.

In this example, the stream includes three modules, a stream head, a protocol module, and a device driver module. The kernel queries the stream to determine if the stream is able to be checkpointed. If the stream is able to be checkpointed, the kernel prompts the stream head to generate checkpoint message 700. The stream head allocates checkpoint header 702 and status message block 720. The stream head also allocates a message block for each module. In this case, stream head allocates message block 704 for the stream head and two additional message blocks (not shown) for the terminal input/output module and the master device module.

Because the modules in the stream are constantly sending messages back and forth between the modules in the stream, the stream head freezes the stream. Freezing the stream refers to suspending all communications or the sending of messages and data from one module to another module in the stream, with the exception of the checkpoint message and/or a restart message. In this example, as long as the stream is frozen, the only message that can be sent to the modules in the stream is checkpoint message 700.

After freezing the stream, the stream head module updates message block 704 with internal state data regarding the internal state of the stream head. The operating system then updates the external state data with the state of any in-flight messages. The stream head then sends checkpoint message to the next module in the stream.

The master device module updates a message block allocated specifically to the master device module (not shown) with internal state data describing the state of the master device module. The operating system then updates external data in the message block for the master device module with state data regarding any in-flight messages sent by or sent to the master device module that have not been received by the intended recipient of the message. If the master device module experiences any problems during this process, the master device module sends an acknowledge "ACK" message to the stream head indicating that the checkpoint controller has experienced a problem and/or failed to complete the checkpoint procedure.

When the checkpoint procedure is complete and the total number of modules processed 722 is equal to the total number of modules to be processed 724, the last module sends an acknowledge ("ACK") message to the stream head. Upon receiving the acknowledge message, the kernel saves the checkpoint data in checkpoint message 700 to state files.

The checkpoint data may then be used to restore or migrate the applications running on the software partition on the original computing device to the different computing device using the state data. In another embodiment, if the user wants to continue to allow the applications to resume running on the original software partition, the stream head unfreezes the stream allowing the modules in the stream to resume sending and receiving messages in the stream. In another example, when the application and device driver are being restored on another computing device, the kernel checks for the restorability of the stream. If the stream is restorable, the kernel makes a determination as to whether the correct number of modules is present in the stream in the correct order. If the correct number and order of modules is not available and/or if the stream is not restorable, the kernel sends an error message to the user.

If the stream is restorable and the correct number and order of modules is present, the stream head allocates a restart message using the state data saved in the state file. The restart message includes checkpoint header 702, status message block 720, and a message block for each module in the stream. In this example, the restart message includes message block 704 allocated for the stream head and two other message blocks allocated for the tioc module and the master device module. The restart message includes all the internal state data and external state data for each module that was updated during the checkpoint controller. In other words, the restart message is the same or similar to checkpoint message 700 after the last module updated the internal and external data for the module in checkpoint message 700 and the checkpoint procedure is complete.

The stream module freezes the stream so that all communications between the modules is suspended, except for the checkpoint message and/or restart message. The stream module uses the internal data in message block 704 to update the internal state of stream module. The operating system uses the internal state data in message block 704 to restore any in-flight messages for the stream head. The stream head then passes the restart message to the next module in the stream. The next module updates the internal data of the module using internal data in a message block allocated to the module. The operating system updates any in-flight messages for the module using the external data. The module then passes the restart message to the next module in the stream that needs to update using the restart message.

The stream described in FIG. 7 is not limited to a stream having only three modules. The stream described in FIG. 7 may include any number of modules and any type of modules in the stream.

Figure 8:
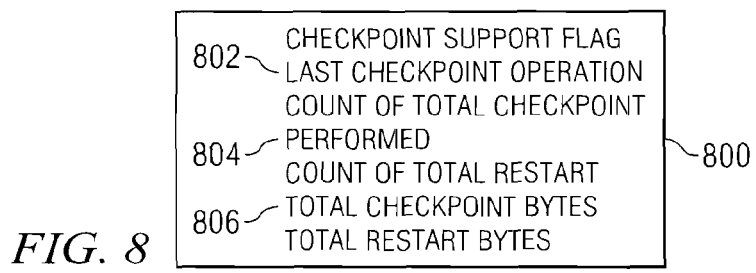
FIG. 8 is a block diagram illustrating a status message block in accordance with an illustrative embodiment.

Referring now to FIG. 8, a block diagram illustrating a status message block is depicted in accordance with an illustrative embodiment. Status message 800 includes checkpoint status. For example, status message 800 includes information regarding checkpoint support flags, the last checkpoint operation performed 802, the count of total checkpoints performed 804, the count of total restart operations, the total checkpoint bytes used 806, and the total restart bytes used. When a checkpoint is performed for a particular pseudo terminal stream, the count of total checkpoints performed 804 is incremented up. Likewise, when a restart is completed, the count of total restarts is incremented up by one.

Status message 800 provides information regarding checkpoints and restarts to a user and/or to the checkpoint controller for use in managing the checkpoint and restart process. For example, a user may determine that total checkpoint bytes 806 are so high that the checkpoint controller is too expensive to perform for a given application. Status message 800 is updated in the checkpoint message or the restart message as the checkpoint or restart message is sent from one module to the next.

Thus, the checkpoint and restart of a stream requires the capture and restore of the internal and external state data associated with the stream. Specifically, the checkpoint controller captures the state of the stream head that interacts with the application, the state of messages in-flight between the modules in the stream, and the state of the device driver module that connects to the hardware terminal.

A stream based pseudo terminal can be opened in one of two modes, an AT&T mode or a BSD mode. AT&T mode pseudo terminals, such as AT&T's System V, expect that when a pseudo terminal slave device is opened, a corresponding pseudo terminal master device is already opened. If a corresponding pseudo terminal master is not opened, then the open call to the pseudo terminal slave fails. This restriction is not applicable to BSD style pseudo terminals. However, the embodiments described below do not require that a pseudo terminal device be only an AT&T type device or a BSD type device. The pseudo terminal may be any type of known or available pseudo terminal device in accordance with the embodiments.

During a restart, the checkpoint controller reassembles the stream, the pseudo terminal state, and all socket associations. The checkpoint controller begins by reopening the file descriptors associated with the restarting process using a list of open file descriptors generated and saved during the last checkpoint operation. When the file descriptor is associated with a pseudo terminal, the checkpoint process opens the pseudo terminal device.

This can present a series of difficult problems for the pseudo terminal subsystem because it requires the pseudo terminal master and pseudo terminal slave opens be allowed to occur in random order, such as, without limitation, the master first then the slave, the slave first and then the master, or the slave associated with /dev/pts/2 before the slave associated with /dev/pts/0.

One difficulty is that, in normal operation, the AT&T type pseudo terminal device does not permit the opening of the slave device before the master device. This occurs because the AT&T type pseudo terminal device assigns the slave to a master at the point when the master is first opened. This cannot occur at a restart open because each slave is paired with a specific master device and it is not known at restart open which slave is paired with which master device.

The second difficulty is that, in normal operation, the AT&T pseudo terminal device assigns slaves to masters in sequential order, according to the slave minor number. For example, /dev/pts/0 is assigned first, then /dev/pts/1 is assigned, and then /dev/pts/2 is assigned. The pseudo terminal device does not expect that /dev/pts/2 will be opened before /dev/pts/0. To resolve these difficulties, this illustrative embodiment allows the opening of pseudo terminal master and pseudo terminal slave in random order for AT&T devices by creating a PTS list and a PTM wait list.

Figure 9:
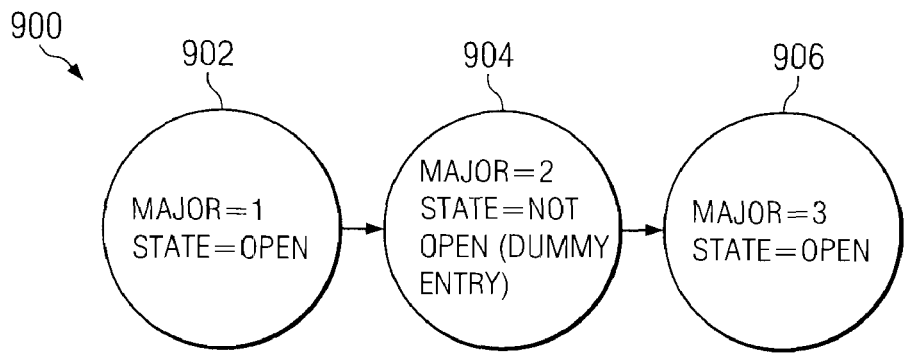
FIG. 9 is a block diagram illustrating a PTS list in accordance with an illustrative embodiment.

FIG. 9 is a block diagram illustrating a PTS list in accordance with an illustrative embodiment. PTS list 900 is a wait queue for pseudo terminal slave devices that are waiting for a corresponding master device to be opened and/or waiting for a socket, if any, to be opened.

During a restart process, if a file descriptor is for a pseudo terminal master, the checkpoint controller creates the module queue internal structure and marks the pseudo terminal master device as open in the module queue internal structure. The module queue internal structure is a queue on the kernel for storing data that is pending or queued in the system.

If the file descriptor is for a pseudo terminal slave device, the checkpoint controller searches PTS list 900 for an entry for the slave device identified by the file descriptor. If the checkpoint controller finds an entry for the slave device, the checkpoint controller marks the entry as open. If an entry is not found in PTS list 900 for the slave device, the checkpoint controller creates an entry in PTS list 900 for the slave device and inserts dummy entries for all the pseudo terminal slave devices which have lesser minor numbers than the slave device associated with the pseudo terminal.

In this example, PTS list 900 includes an entry 902 for an open slave device, an entry 904 for an unopened slave device that is a dummy entry, and an entry 906 for an open slave device. The dummy entry 904 is marked not opened. The dummy entry 904 is essentially a place holder for the slave device that should be opened after slave device 1 associated with entry 902 and after slave device 3 associated with entry 906. The slave devices are listed in order according to their minor number.

When a file descriptor associated with a socket is opened at restart, the checkpoint controller calls network services to write the state of the checkpointed socket into the structures associated with this new socket file descriptor. A significant problem is that the restoration of the socket state may occur after the restoration of the pseudo terminals and vice versa. Therefore, the new socket information is conveyed to the pseudo terminal subsystem so that the correct pseudo terminal master and pseudo terminal slave pair and socket association is recreated after restart.

If a master device is paired with an incorrect slave, it could result in a user losing their log in session or being logged into a different user's session. In other words, if a user is checking email when the application is moved to a different server during a checkpoint and restart operation and a master device is paired to an incorrect slave device, the user could lose their email login session and be forced to re-log in to the email server.

After opening the file descriptor for a pseudo terminal and/or a socket, the checkpoint controller sends an input/output control (ioctl) command restart to the stream heads associated with the pseudo terminal. The checkpoint data for the pseudo terminal stream and sockets saved during the checkpoint operation, including, but not limited to, information about socket associations, is sent with the ioctl call.

It is not necessary to send all of the checkpoint data to any particular device during this restart procedure. It is only necessary for the checkpoint controller to send the checkpoint data that is associated with that particular device. For example, when the process restarts the slave /dev/pts/2, the checkpoint controller sends the state information associated with that pseudo terminal slave device (pty). The information describes which socket, if any, is associated with that slave and which master device is associated with that slave device. The master and/or the socket may not have been restored at this point. In this case, the slave device has to wait for the master device and/or the slave device to be opened. The slave device waits in PTS list 900.

If the ioctl call is received by a pseudo terminal master device on an AT&T type pseudo terminal device and the checkpoint data indicates that one or more pseudo terminal slaves are open, the master device scans PTS list 900 for a pseudo terminal slave device corresponding to the master device that is opened. A corresponding slave device is a slave device that is the correct slave device pair for a particular master device. The master device determines if a corresponding slave device is indicated as being opened in the PTS list by checking the slave minor number. The master device received the corresponding slave device's minor number from the checkpoint data the master device received in the ioctl message.

If an open corresponding slave device is found in the PTS list, the master device changes the state of the corresponding slave device in the PTS list entry for the slave device to indicate that the master device is also opened. The state of both the master device and the corresponding slave device are connected. At this point, the pseudo terminal master device and the corresponding pseudo terminal slave device are both restored to form a master/slave pair.

If the master device does not find a corresponding slave device in the PTS list, the master device adds an entry to a master wait list for the master device. The master wait list is created for the master devices that are waiting for corresponding slave devices to be opened.

Figure 10:
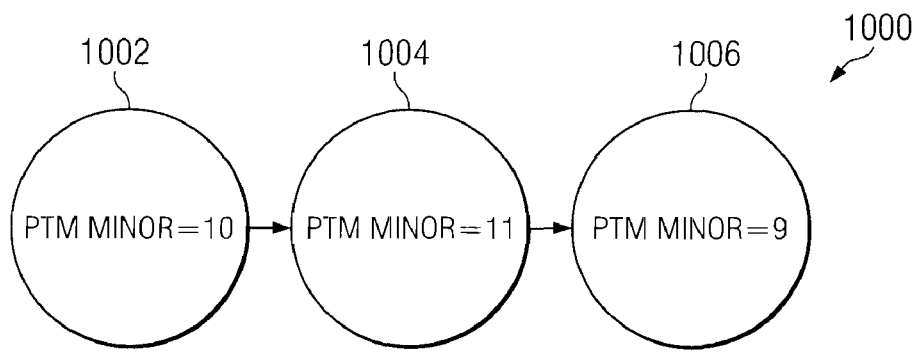
FIG. 10 is a block diagram of a PTM wait list in accordance with an illustrative embodiment.

Turning now to FIG. 10, a block diagram of a PTM wait list is shown in accordance with an illustrative embodiment. PTM wait list 1000 is a queue for open pseudo terminal master devices that are waiting for a corresponding pseudo terminal slave device to be opened during the restart process. In a data processing system that requires a pseudo terminal slave device be open before the corresponding pseudo terminal master device is opened and/or requires that pseudo terminal slave devices be opened in a particular order, such as in an AT&T type pseudo terminal device, PTM wait list 1000 provides a queue to hold open master devices for which a corresponding slave device has not yet been opened. In this manner, a mechanism is provided that permits master devices and slave devices to be opened and restored during restart in a random order.

Open pseudo terminal master devices 1002-1006 are identified in PTM wait list 1000. When a slave device corresponding to one of the master devices identified in PTM wait list 1000 is opened, the entry for the corresponding master device is removed from PTM wait list.

If the ioctl message and checkpoint data is received by a pseudo terminal slave device, the slave device checks if the corresponding master device is already opened. If the corresponding master device is already opened, then the slave device copies the checkpoint internal data on to the module internal queue indicating that the master device and slave device pair are opened and connects the state of the master device to the state of the corresponding slave device. At this point, the master device and the corresponding slave device are both restored to form a master/device pair.

If the corresponding master device is not already opened, the slave device scans PTM wait list 1000 for the corresponding master device. The slave device checks PTM wait list 1000 for the minor number of the slave device to identify the corresponding master device. The slave device then removes the master device from PTM wait list 1000 and marks the corresponding master device as open. The slave device then copies the checkpoint internal data on to the module queue for the master device and slave device pair and connects the state of the master device to the state of the slave device.

If the ioctl message is received on a pseudo terminal device that does not require a slave device be opened before the master device and/or does not require slave devices be opened in a particular order, such as a pseudo terminal on a BSD device, the checkpoint controller copies the checkpoint internal data from the ioctl message to the module's internal queue without the need for creating a PTS list or a PTM wait list.

Figure 11:
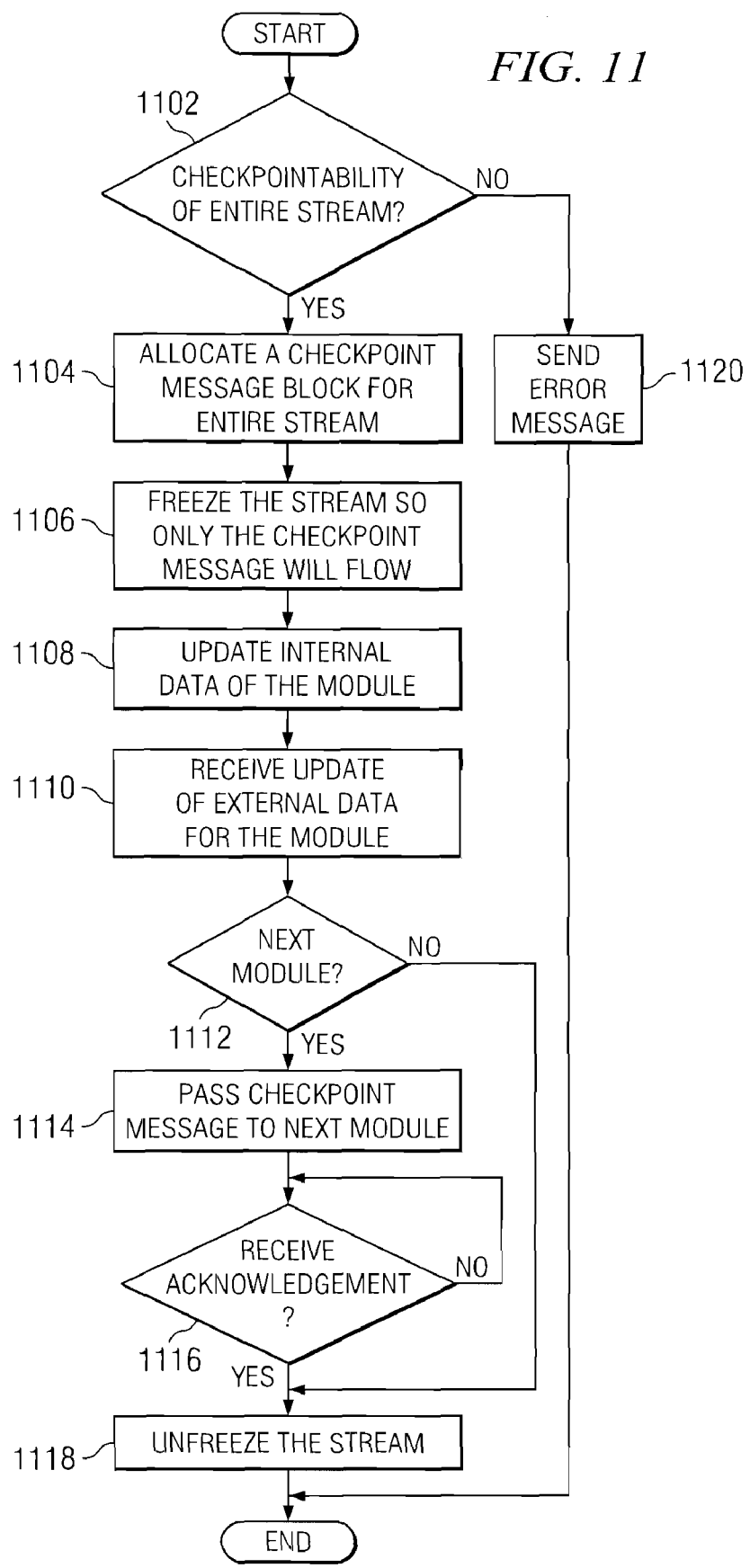
FIG. 11 is a flowchart illustrating a process for a stream head passing a checkpoint message downstream during a checkpoint procedure in accordance with an illustrative embodiment.

FIG. 11 is a flowchart illustrating a process for a stream head passing a checkpoint message downstream during a checkpoint procedure in accordance with an illustrative embodiment. The process in FIG. 11 may be implemented by a module in a pseudo terminal stream, such as stream head 410 or 414 in FIG. 4.

The process begins with the stream head module making a determination as to whether the entire stream is able to be checkpointed (step 1102). This objective may be performed by checking the checkpoint state associated with each queue. If the entire stream is checkpoint-able, then the stream head allocates a checkpoint message block, such as checkpoint message 700 in FIG. 7, for the entire stream (step 1104). The checkpoint message block can contain the checkpoint information of the entire stream. The checkpoint message block will include a checkpoint header and a message block for each module in the stream. In another embodiment, the checkpoint message block is generated by the checkpoint controller, rather than being allocated by the stream head.

The stream head freezes the stream so that only the checkpoint message will flow between the modules in the pseudo terminal stream (step 1106). In other words, all communication between the modules in the stream is suspended, with the exception of the checkpoint message which is able to be passed between the modules in the stream. This frozen state is a special state of the stream in which only the checkpoint message will flow between the modules.

The stream head module then updates the internal data of the module in the checkpoint message (step 1108). The stream head module receives an update of external data for in-flight messages associated with the module from the operating system (step 1110). The update of the external data is performed by the operating system.

The stream head makes a determination as to whether a next module is in the stream (step 1112). If a next module is in the stream that needs to be checkpointed, the stream head module sends the checkpoint message to the next module (step 1114). In this example, after the stream head passes the checkpoint message to the next model in the stream, each module in the stream updates their respective checkpoint data and also the checkpoint status in the checkpoint message for the stream. If the checkpoint does not encounter any problems, each module will then pass the checkpoint message to the next module in the chain until the last module receives the checkpoint message, updates, and sends an acknowledge message back to the stream head. In this embodiment, the last module in the stream is either the pseudo terminal slave device or the pseudo terminal master device.

Returning to step 1114, the stream head makes a determination as to whether an acknowledge message is received (step 1116) indicating that the checkpoint procedure is complete or an acknowledge message indicating that a problem was encountered by one of the modules in the stream that prevents the checkpoint procedure from completing. If an acknowledge message is not received, the process returns to step 1116 and waits until an acknowledge message is received. When the acknowledge message is received at step 1116 indicating that the checkpoint is complete, the stream head module unfreezes the stream to allow the modules to pass messages between the modules (step 1118) with the process terminating thereafter.

The checkpoint data is then saved by the kernel into a state file in a data storage device or stored in a buffer. This checkpoint data is later used during the restart process to restore the state of the stream on a new software partition after migration of the software partition.

Returning to step 1102, if the entire stream is not able to be checkpointed, that is, if all the modules in the stream cannot perform a checkpoint, then the module sends an error message (step 1120) indicating that a checkpoint cannot be performed. The stream is then unfrozen (step 1118) with the process terminating thereafter.

In another embodiment, when an acknowledge message is received indicating the checkpoint is complete, the stream head may not unfreeze the stream associated with the departure server because the user may not wish to continue running the application in the original software partition. The checkpoint controller may prefer to discontinue execution of the application in the original software partition because the application is being migrated to a new software partition where the application will continue to run in the new software partition. Therefore, unfreezing the stream on the departure server is unnecessary.

Figure 12:
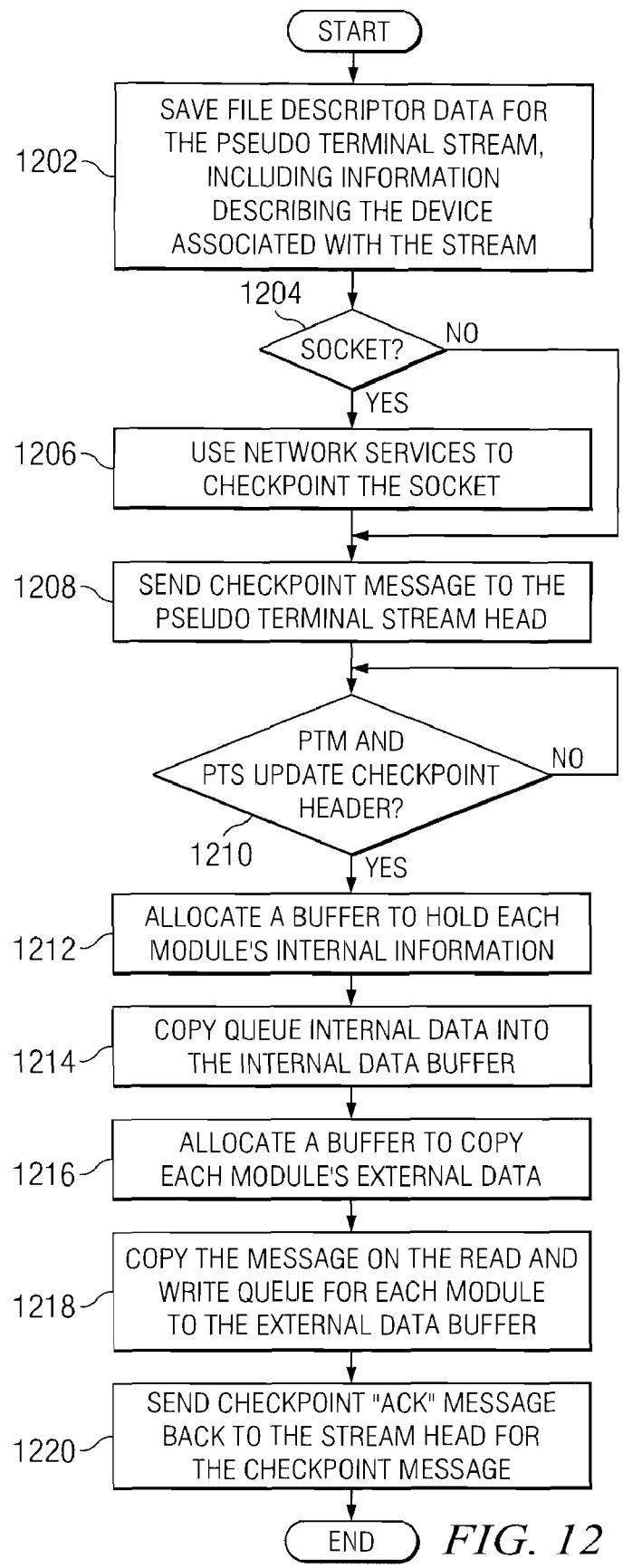
FIG. 12 is a flowchart illustrating a process for checkpointing a pseudo terminal stream in accordance with an illustrative embodiment.

Turning now to FIG. 12, a flowchart illustrating a process for checkpointing a pseudo terminal stream is shown in accordance with an illustrative embodiment. The process in FIG. 12 may be implemented by a checkpoint process for gathering checkpoint data associated with a pseudo terminal, such as checkpoint controller 321 in FIG. 3.

The process in FIG. 12 is used to checkpoint the stream associated with the master device and the stream associated with the slave device. The stream associated with the master device is checkpointed using this procedure separately from the stream associated with the slave device. In other words, the process in FIG. 12 is implemented twice, once to checkpoint a stream associated with a master device and the process is implemented again to checkpoint a stream associated with the slave device.

The process begins by saving file descriptor data that is associated with the pseudo terminal streams, including saving information describing the device associated with the streams (step 1202). The information describing the device may describe the device as a pseudo terminal master device, a pseudo terminal slave device, or a socket associated with a pseudo terminal master device and pseudo terminal slave device pair.

The process makes a determination as to whether a file descriptor is associated with a socket, such as an Internet socket (step 1204). If a file descriptor is associated with a socket, such as in socket association 606 in FIG. 6, the process uses network services to checkpoint the socket (step 1206). The network services provides data describing the Internet socket, the local Internet Protocol (IP) address, the protocol, the local port, the remote IP address, the remote port, and/or any other information describing the state of the Internet socket.

After saving checkpoint data for the Internet socket at step 1206 or in response to a determination that the file descriptor is not associated with an Internet socket, the process sends a checkpoint message to the pseudo terminal stream head (step 1208). The stream head may be a stream head associated with a master device or a stream head associated with a slave device. The stream head passes the checkpoint message downstream, to each module in the stream, as is described in FIG. 11 above.

When a module in the stream receives the checkpoint message, the module updates internal data for the module in the checkpoint message block allocated to the module. The module detects an update of external data for the module by the operating system. The operating system updates external data in the message block allocated to the module regarding in-flight messages sent by the module or intended to be received by the module. If any problems have been encountered during the checkpoint, the module sends an acknowledge message "ACK" to the stream head to indicate that the checkpoint was unable to complete. If no problem is encountered, the module sends the checkpoint message to the next module in the stream. If a next module is not in the stream, the module sends an acknowledge message to the stream head indicating that the checkpoint is complete.

Returning to step 1208, after sending the checkpoint message to the stream head, the process makes a determination as to whether all pseudo terminal master devices and all pseudo terminal slave devices in the stream have updated the checkpoint header with internal state data for the master device and slave device (step 1210). If all PTM and PTS modules have not updated the checkpoint header, the process returns to step 1208 and waits for all modules to update the checkpoint message.

When all modules have updated the checkpoint message at step 1210, the process allocates a buffer to hold each module's internal information (step 1212). Thus, each slave device has space in the buffer for the slave module's internal information and each master device has space in the buffer for storing checkpoint data describing the internal state of the master device.

The process copies queue internal data into the buffer (step 1214). The queue internal data includes, but is not limited to, pty state flag, slave minor number, and/or any other internal data describing the state of the master device and slave device.

The process copies the message on the read and write queue for the master (PTM) and slave (PTS) modules to the allocated buffer (step 1218). The process then sends a checkpoint acknowledge "ACK" signal back to the stream head indicating that the checkpoint message has been updated with checkpoint data for the stream modules and queue (step 1220) with the process terminating thereafter.

Figure 13:
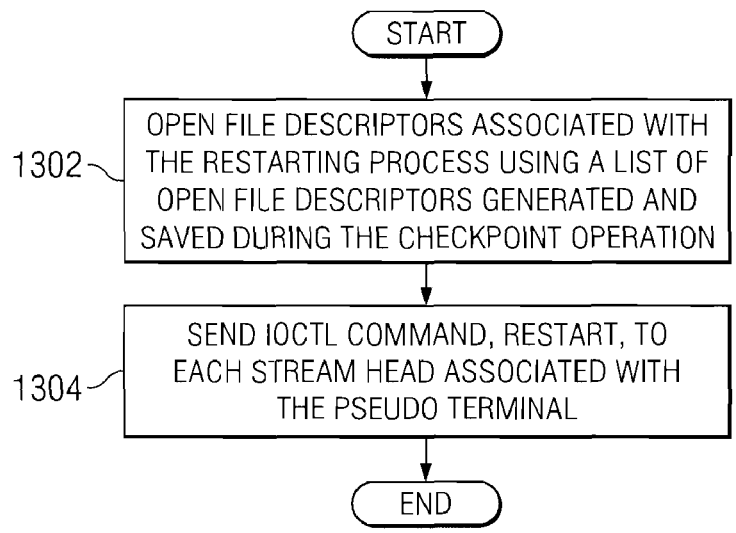
FIG. 13 is a flowchart illustrating a process for restarting a stream-based pseudo terminal in accordance with an illustrative embodiment.

Referring now to FIG. 13, a flowchart illustrating a process for restarting a stream-based pseudo terminal is depicted in accordance with an illustrative embodiment. The process is implemented by a checkpoint controller associated with a process, such as checkpoint controller 321 in FIG. 3.

The process begins by opening file descriptors associated with the re-starting process, such as process 320 in FIG. 3, using a list of open file descriptors generated and saved during the checkpoint operation (step 1302). The process sends an input/output control command and restart message to each stream heads associated with the pseudo terminal to initiate restart of the streams (step 1304) with the process terminating thereafter. Checkpoint data associated with each pseudo terminal device is sent to the stream heads with the ioctl message. That data contains the information on the socket associated with the pseudo terminal, if there is one.

The stream heads use the checkpoint data and information describing socket associations to recreate the streams and associated sockets on the arrival server. In other words, during restart, the checkpoint controller reassembles the stream, pseudo terminal state, and socket associations from the checkpoint data saved during the checkpoint phase on the departure server.

Figure 14:
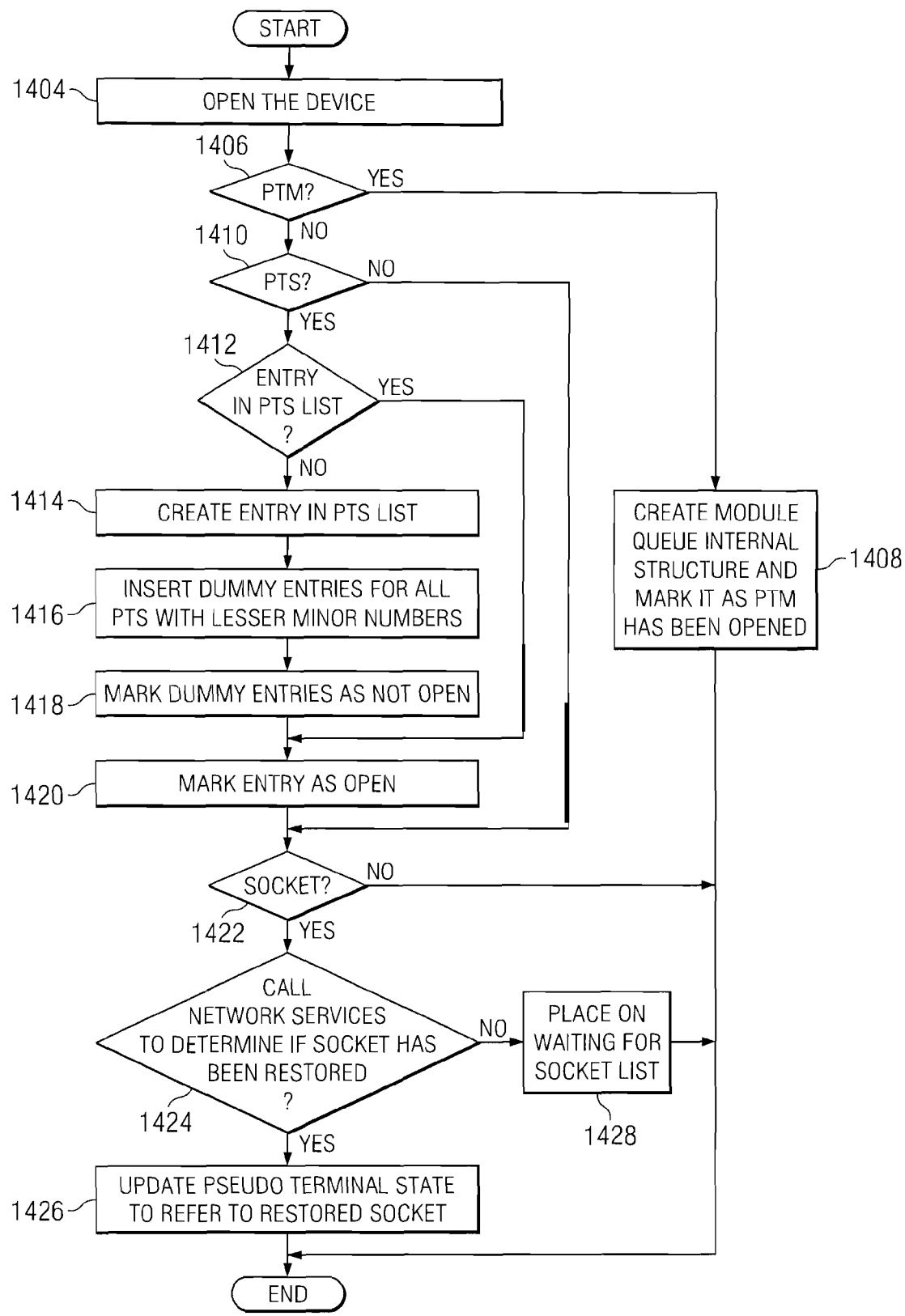
FIG. 14 is a flowchart illustrating a process for reopening file descriptors associated with a restarting process in accordance with an illustrative embodiment.

FIG. 14 is a flowchart illustrating a process for reopening file descriptors associated with a restarting process in accordance with an illustrative embodiment. The process in FIG. 14 is implemented by a kernel module, such as stream head 410 and 414 in FIG. 4 or a device driver module. Step 1404 and 1422 may be implemented by a checkpoint process, such as checkpoint controller 321 in FIG. 3.

The checkpoint process opens a device associated with a file descriptor (step 1404). The device may be a pseudo terminal master device, a pseudo terminal slave device, or a socket. For example, a file descriptor, such as, without limitation, /dev/ptc/, /dev/pts/0, /dev/ptty0, and/or /dev/ttyp0 are for pseudo terminal master and slave devices.

The kernel module makes a determination as to whether the device opened in step 1404 is a master device (step 1406). If the device is a master device, the kernel module creates the module queue internal structure and marks the module queue to indicate the master device has been opened (step 1408) with the process terminating thereafter.

Returning to step 1406, if the device is not a master device, the kernel module makes a determination as to whether the file descriptor opens a slave device (step 1410). If the file descriptor does open a slave device, the kernel module searches a PTS list for an entry associated with the slave device that has been opened (step 1412). The PTS list is a slave wait queue for slave device waiting for a corresponding master device to be opened. The PTS list contains entries for slave devices that are already opened and may also contain "dummy" entries for slave devices that have not yet been opened. The dummy entries are placed in the PTS list as place holders for slave devices with lesser minor numbers that are supposed to be opened before slave devices with greater minor numbers.

If an entry is not found for the slave device, the kernel module creates an entry for the slave device in the PTS list (step 1414) and inserts dummy entries in the PTS list for all slave modules with lesser minor numbers that have not yet been opened (step 1416). The kernel module marks the dummy entries as "not open" (step 1418).

After creating the entry for this given slave module at step 1414 or if an entry for the slave module is found in the PTS list at step 1412, the kernel module marks the entry for the opened slave module as "open" (step 1420). An entry for this given slave device could be found in the PTS list at step 1412 if the given slave device has a lesser minor number than one or more other slave devices that were opened earlier in time. In which case, a dummy entry would have been created for the given slave device, marked "not open." Now, when the dummy entry is found, the entry is changed to "open" to indicate that the given slave device has now been opened. At this point, the entry for the given slave device is no longer a placeholder "dummy" entry.

The checkpoint process then makes a determination as to whether a file descriptor opens a socket (step 1422). If the file descriptor is not a socket file descriptor for opening an Internet socket, the kernel module terminates thereafter.

At step 1422, if the file descriptor does open a socket, the kernel module calls network services to determine if the socket has been restored (step 1424). If the socket has been restored, the kernel module updates the pseudo terminal state to refer to the restored socket (step 1426) with the kernel module terminating thereafter.

Returning to step 1424, if the socket has not been restored, the kernel module places the socket on a waiting for socket list (step 1428) with the process terminating thereafter. The waiting for socket list is a queue for open sockets that are waiting for a corresponding master/slave pair to be opened. The socket is conveyed placed on the waiting list so that the correct master and slave pair will be associated with the correct socket at restart. If the incorrect master and slave socket association is restarted, a user's login session may be disrupted or terminated.

Thus, the pseudo terminal device driver knows the socket associated with the pseudo terminal. It is part of the checkpoint state. When the slave is restarted, the driver queries the kernel asking if the socket associated with the slave device has been restored. If the socket has been restored, the pseudo terminal is associated with the restored socket. If the socket has not been restored, the slave device is placed on a waiting for socket list. When all restoration is complete and all sockets have been restored, the slave device driver checks the waiting for sockets list and restores all of the sockets which originally could not be found. If any of the sockets still cannot be found, then something is wrong and the restart procedure fails.

Figure 15:
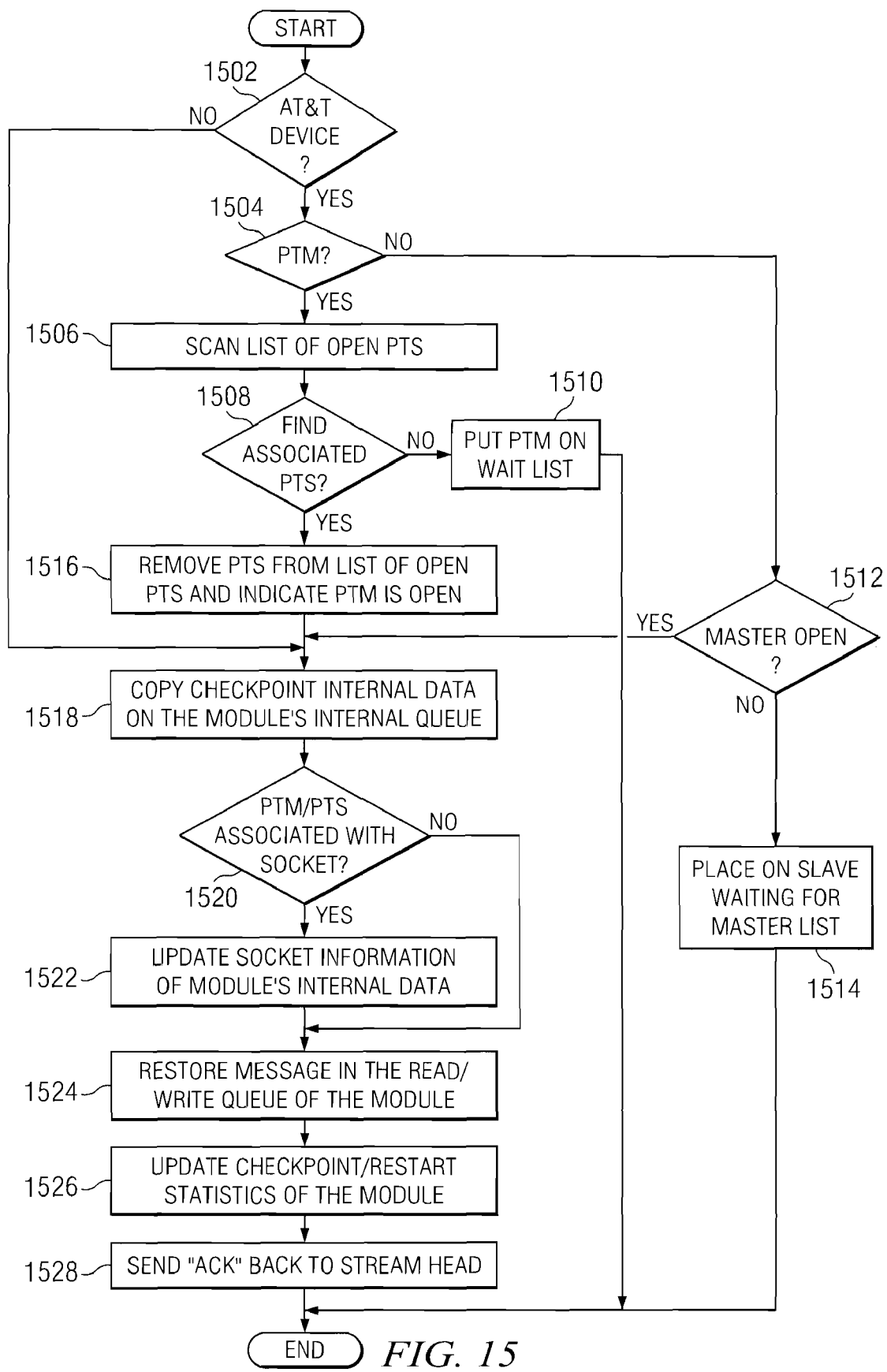
FIG. 15 is a flowchart illustrating a process for restarting master and slave modules associated with a stream-based pseudo terminal in accordance with an illustrative embodiment.

Turning now to FIG. 15, a flowchart illustrating a process for restarting master and slave devices associated with a stream-based pseudo terminal in accordance with an illustrative embodiment. The process is implemented by a software process for restarting a stream-based pseudo terminal after a process has been migrated from a first software partition to a second software partition, such as, checkpoint controller 321 in FIG. 3. Steps 1506-1518 may be performed by a pseudo terminal master device, such as master device 402 in FIG. 4. Steps 1514-1518 may be performed by a pseudo terminal slave device, such as slave device 404 in FIG. 4.

The process begins by making a determination as to whether an input/output control (IOCTL) message is received by an AT&T type pseudo terminal device (step 1502). If the message is received by a device that requires that a corresponding slave device be opened before a master device is open and/or requires that slave devices be opened in a particular order, such as an AT&T type pseudo terminal device, the process makes a determination as to whether the device is a master (PTM) (step 1504).

If this is a master device, the process scans a list of open slave (PTS) devices to determine if the master has an associated slave device that is already open (step 1506). If the process does not find an associated open slave device (step 1508), the process adds the master to the wait list (step 1510) with the process terminating thereafter. The master will stay on the wait list until the slave module associated with the master is opened.

Returning to step 1504, if the device is not a master, the device is a slave. The process then determines if a master associated with the slave is open (step 1512). If a master associated with the slave is not open, the process scans the PTM list for the master device and removes the master from the wait list (step 1514) with the process terminating thereafter. The module places the slave device on the queue for slave devices waiting for a master. When the corresponding master is opened, the corresponding master removes the slave from the wait list.

Returning to step 1508, if an open slave associated with the master is listed, the process removes the slave from the PTS list and indicates the master is open (step 1516) and copies the checkpoint internal data for the master on to the module internal queue (step 1518). We now have an open master and slave pair.

The process then makes a determination as to whether the open master and slave pair is associated with a socket (step 1520). If the master/slave pair is associated with a socket and the associated socket has been restored, the process updates the socket information of the module's internal data with information for the socket (step 1522). As discussed above, if the associated socket has not been restored, the slave device is placed in a queue, referred to herein as a "waiting for socket" list until the associated socket is restored.

After updating socket information for the socket at step 1522 or if a socket is not associated with the master/slave pair at step 1520, the process restores the messages on the read and write queue of the module using the checkpoint data (step 1524). The restart socket information is provided with the ioctl message. The process then updates the checkpoint and restart statistics on the checkpoint module, such as checkpoint module 800 in FIG. 8 (step 1526). The process sends an acknowledge signal back to the stream head indicating the updating the modules for restart is complete (step 1528) with the process terminating thereafter. The stream head then unfreezes the stream and allows the stream to resume normal operation.

In one embodiment, when a module in the pseudo terminal stream receives the restart message, the module updates internal data using restart data in the message block of the restart message allocated to the module. The external data for the module is updated by the operating system. In other words, the in-flight messages associated with the module are restored by the operating system using external data for the module that is provided by the restart message.

In this example, if no problems are encountered during the restart process, the module sends the restart message to a next module is in the stream that still needs to update with restart data in the restart message. If a next module is not in the stream, the module sends an acknowledge message to the stream head indicating that the restart process is complete. If a problem is encountered during the update process, the module sends an acknowledge message to the stream head indicating that restart was not successful.

Figure 16:
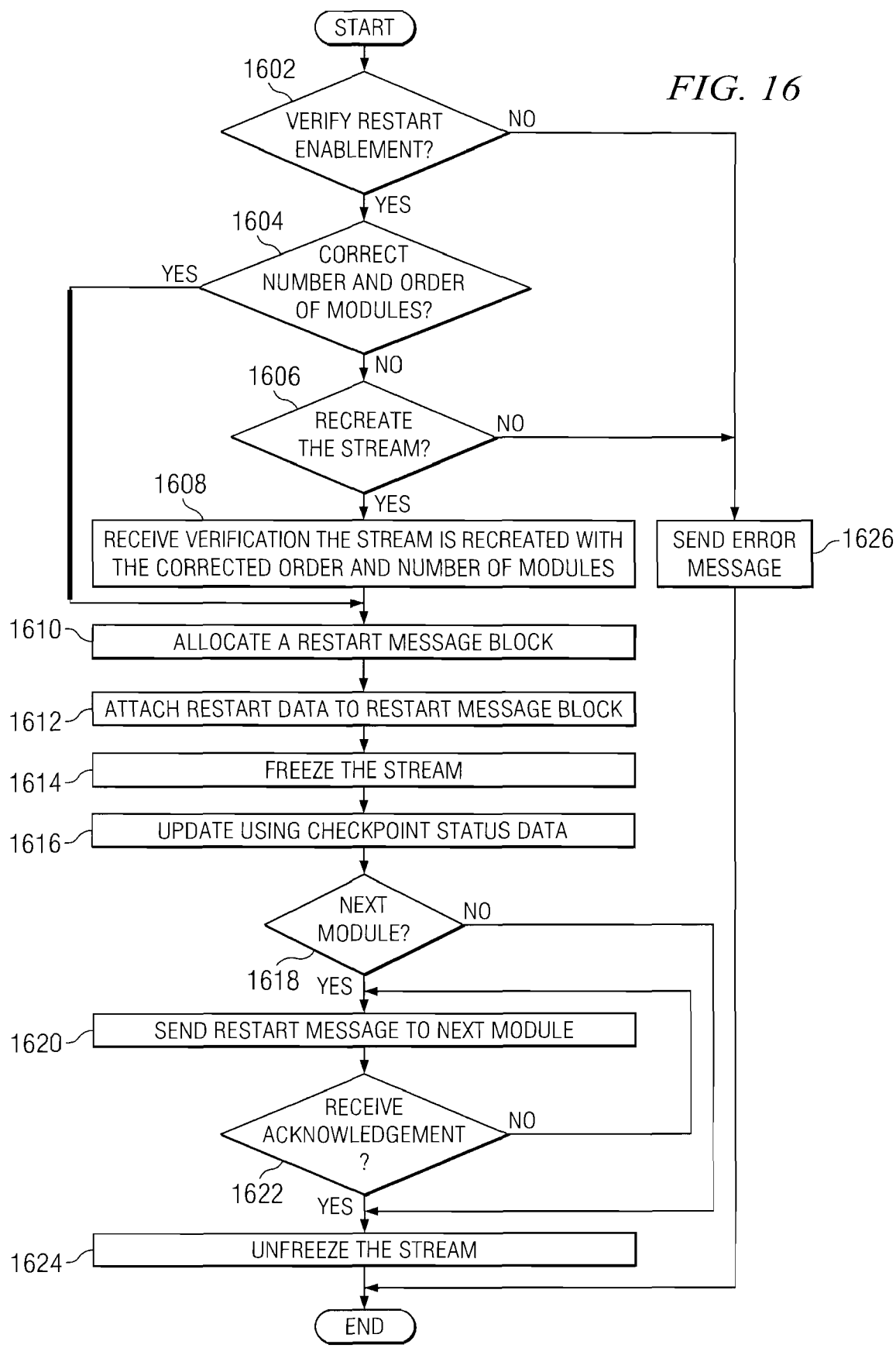
FIG. 16 is a flowchart illustrating a process for a stream head performing a restart in accordance with an illustrative embodiment.

FIG. 16 is a flowchart illustrating a process for a stream head performing a restart in accordance with an illustrative embodiment. The process in FIG. 16 may be implemented by a module in a pseudo terminal stream, such as stream head 410 or 414 in FIG. 4. The application which is restarting the stream provides the state file or the state data in a buffer created by the checkpoint controller. The checkpoint data is passed to the stream head in the same or similar format as checkpoint message 700 in FIG. 7. The checkpoint data may be retrieved by the application from a remote data storage device over a network or from a local data storage device.

The process begins when the stream head verifies the stream is able to restart (step 1602). If the stream is not able to be restarted, such as, without limitation, due to corruption in the checkpoint data or unavailability of the checkpoint data, the stream head sends an error message (step 1626) to the kernel indicating that restart failed.

Returning to step 1602, if the restart is enabled, the stream head determines whether the correct number of modules are present in the stream and whether the modules in the stream are located in the correct order (step 1604). In other words, the stream head verifies that the modules are located at the correct location by matching the module name with provided checkpoint data.

If the correct number and order of modules is not present, the stream head makes a determination as to whether the stream can be recreated with the correct number of modules in the correct order (step 1606). If the stream can be recreated, the stream head receives verification that the stream has been recreated with the correct number of modules in the correct order (step 1608).

Returning to step 1604, if the correct number and order of modules is present, the stream head allocates a restart message block (step 1610) and attaches the restart state data from the state files for the software partition associated with the stream to the restart message block (step 1612). The stream head freezes the stream so that only the restart message can be sent between the modules (step 1614). In other words, in this frozen state, all communications between the modules is suspended with the exception of the restart message.

The stream head updates internal data using the checkpoint status data (step 1616). The external data is updated by the operating system. The stream head then makes a determination as to whether a next module is in the stream (step 1618). If a next module is in the stream, the stream head sends the restart message to the next module in the stream (step 1620). The stream head then waits to receive an acknowledgment that the restart process is complete (step 1622). After receiving the acknowledgment message at step 1622 or if a next module is not in the stream at step 1618, the stream head unfreezes the stream to permit the modules to send messages between the modules in the stream (step 1624). The process terminates thereafter.

Returning to step 1602, if the stream is not enabled for restart or if the stream cannot be recreated at step 1606, the stream head sends an error message (step 1626). The process unfreezes the stream (step 1624) and terminates thereafter.

In this example, when the stream head sends the restart message to the next module, each module in the chain receives the restart message, takes the restart action, updates the checkpoint status data, and then sends the restart message to the next module in the chain. The last module in the chain sends the restart acknowledge message "ACK" to the stream head to acknowledge that the restart process is complete. If any module cannot perform the restart operation, the module sends the acknowledge message to the stream head to indicate that the restart operation did not complete.

The illustrative embodiments provide a computer implemented method, apparatus, and computer usable program code for checkpoint and restart of pseudo terminal streams. In one embodiment, a device associated with a file descriptor in a set of file descriptors is opened. The set of file descriptors are identified in checkpoint data for restarting the pseudo terminal streams. In response to identifying the device as a pseudo terminal slave device, an entry for the identified pseudo terminal slave device is added to a list of open pseudo terminal slave devices. The entry for the identified pseudo terminal slave device is marked as an open pseudo terminal slave device.

The list of open pseudo terminal slave devices is used for restoring pseudo terminal master devices and pseudo terminal slave devices associated with the pseudo terminal streams in a random order without disrupting execution of an application associated with a pseudo terminal master and pseudo terminal slave pair in the pseudo terminal streams being restored.

In other words, if a slave device is being opened on restart, the process determines whether the correct master has already been opened. If the correct master device is opened, the process matches them together to form a master/device pair. The process connects the slave checkpointed state with the master's checkpointed state. If the correct master has not been opened, the process places the slave on a "slave waiting for a master list," referred to above as a list of open pseudo terminal slave devices.

If a master is being opened, the process checks if the associated slave is on the "slave waiting for a master list". If the slave is on the list, the process matches the master and slave to form the master/slave pair. The process then connects the slave's checkpointed state with the master's checkpointed state.

If the corresponding slave is not open, the process places the master device on a "master waiting for a slave list." The process then determines whether the pseudo terminal is associated with a socket. If the master/slave pair is associated with a socket, the process determines if the socket has been restored. If the socket is restored, the process connects the restored socket to the pseudo terminal. If the socket is not restored, the process places the pseudo terminal on a "waiting for socket list".

When the restart is completely finished, and thus all master, slaves, sockets should have been processed, the restart procedure checks all wait queues, including, but not limited to, the list of open pseudo terminal slave devices waiting for a corresponding master device, the list of master devices waiting for a corresponding slave device, and the list of master/slave pairs waiting for a socket to be restored. If all these lists are empty, the restart has succeeded and the restart procedure has correctly matched all master/slave pairs and all pairs associated with a socket have been correctly matched. If any of the lists are not empty, the restart procedure fails because there is an unmatched slave or master or socket.

Thus, the illustrative embodiments provide a computer implemented method, apparatus, and computer program product for a restarting a pseudo terminal in a software partitioned environment. The embodiments have been described as utilizing checkpoint data to move a software partition. However, the embodiments are also used to restore the processes in the same software partition, without migrating the software partition to an arrival server, after a system crash or other disruption to the server's operation.

Moreover, the illustrative embodiments have been described as being implemented to checkpoint and/or restart an application associated with a stream based pseudo terminal. However, the illustrative embodiments may be used to checkpoint and/or restart any application associated with any stream architecture for communicating and interacting with a physical device or a pseudo device. For example, the embodiments may be used for checkpointing and restarting streams associated with a physical terminal, physical tape drive, a physical printer, a physical terminal teletype (tty), or a virtual tty.

The illustrative embodiments are applicable to any product using streams technology or architecture like streams for performing checkpoint and restart of the set of kernel modules associated with a pseudo terminal device.

Thus, the illustrative embodiments allow a user to move software partitions and applications running in the software partition to be moved from one server to another server without causing any disruption to the applications and processes running on the servers. The applications and processes running on the server are not interrupted as a result of the move. Moreover, an application running in a migrated partition is not aware that the application has been moved to a different server.

The process allows applications to be moved to another machine, even if a user is remotely logged in to the application without the user becoming aware that the application has been moved to a different machine. In other words, the user's login session or Telnet session continues without interruption during and after the migration of the software partition and the applications. The user is not required to log-out of any applications or services running on a software partition prior to moving the software partition and all associated applications and services to the new machine. Thus, the software partition migration is transparent to the user.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the steps may occur out of the order noted in the figures. For example, two steps shown in succession may, in fact, be executed substantially concurrently, or the steps may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable medium or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The computer-usable medium can also be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk, millipede storage technology, Magneto-resistive random access memory (MRAM), or phase-change memory, also known as PCM, PRAM, Ovonic Unified Memory, and Chalcogenide RAM (C-RAM). Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for restarting pseudo terminal streams, the computer implemented method comprising:

opening a device associated with a file descriptor in a set of file descriptors, wherein the set of file descriptors are identified in checkpoint data for restarting the pseudo terminal streams;

responsive to identifying the device as a pseudo terminal slave device, adding an entry for the identified pseudo terminal slave device to a list of open pseudo terminal slave devices;

marking the entry for the identified pseudo terminal slave device as an open pseudo terminal slave device, wherein the list of open pseudo terminal slave devices allows pseudo terminal master devices and pseudo terminal slave devices associated with the pseudo terminal streams to be restarted in a random order; and responsive to identifying the device as a socket associated with a pseudo terminal device, calling network services to write a state of the socket into a data structure in a pseudo terminal stream in the pseudo terminal streams being restarted, wherein information in the checkpoint data describes the state of the socket, a correct pseudo terminal master device, and a pseudo terminal slave device pair associated with the socket.

2. The computer implemented method of claim 1 further comprising:

responsive to identifying a set of unopened pseudo terminal slave devices that are to be opened before the identified pseudo terminal slave device, creating a set of dummy entries in the list of open pseudo terminal slave devices, wherein each dummy entry represents an unopened pseudo terminal slave device in the set of unopened pseudo terminal slave devices.

3. The computer implemented method of claim 1 further comprising:

responsive to identifying the device as the pseudo terminal master device, creating a module for a pseudo terminal master device that is being restarted, wherein the module comprises a module queue internal structure.

4. The computer implemented method of claim 1 further comprising:

responsive to receiving a restart command by a pseudo terminal master device in the pseudo terminal streams, scanning the list of open pseudo terminal slave devices for an entry identifying a pseudo terminal slave device corresponding to the pseudo terminal master device to form a corresponding pseudo terminal slave device; and responsive to finding the entry identifying the corresponding pseudo terminal slave device in the list of open pseudo terminal slave devices, copying internal checkpoint data for the pseudo terminal master device to a module in the pseudo terminal streams representing the pseudo terminal master device.

5. The computer implemented method of claim 4 further comprising:

responsive to determining that an entry identifying the corresponding pseudo terminal slave device is not present in the list of open pseudo terminal slave devices, placing the pseudo terminal master device in a wait queue.

6. The computer implemented method of claim 1 further comprising:

responsive to receiving a restart command by a pseudo terminal slave device in the pseudo terminal streams, scanning a wait queue for an entry identifying a pseudo terminal master device corresponding to the pseudo terminal slave device to form a corresponding pseudo terminal master device; and responsive to finding the entry identifying the corresponding pseudo terminal master device in the wait queue, removing the pseudo terminal master device from the wait queue and copying internal checkpoint data for the pseudo terminal slave device to a module in the pseudo terminal streams representing the pseudo terminal slave device.

7. The computer implemented method of claim 6 further comprising:

responsive to a failure to find the entry identifying the corresponding pseudo terminal master device in the wait queue, placing the pseudo terminal slave device in a queue for slave devices waiting for a master device.

8. The computer implemented method of claim 1 further comprising:

responsive to restoring a master device and a corresponding slave device to form a master and slave pair, calling network services to determine if a socket associated with the master and slave pair is restored;

responsive to a determination that the socket is restored, updating a state of the pseudo terminal stream to refer to the socket; and responsive to a determination that the socket is un-restored, placing the master and slave pair on a wait queue for master and slave pairs waiting for restoration of an associated socket.

9. The computer implemented method of claim 1 wherein the checkpoint data is generated during a checkpoint procedure, and wherein the checkpoint procedure further comprises:

saving file descriptor data associated with the pseudo terminal streams to form a list of file descriptors;

sending a checkpoint message to a pseudo terminal stream head;

allocating a buffer to hold the checkpoint data, wherein the checkpoint data comprises internal checkpoint data for each module in the pseudo terminal stream, external checkpoint data for each module in the pseudo terminal stream, and messages on a read and write queue associated with the pseudo terminal streams.

10. A computer program product comprising:
a non-transitory computer readable storage medium including computer usable program code for restarting pseudo terminal streams, the computer program product comprising:
computer usable program code for opening a device associated with a file descriptor in a set of file descriptors identified in checkpoint data for restarting the pseudo terminal streams;
computer usable program code for adding an entry for an identified pseudo terminal slave device to a list of open pseudo terminal slave devices in response to identifying the device as a pseudo terminal slave device to form the identified pseudo terminal slave device;
computer usable program code for marking the entry for the identified pseudo terminal slave device as an open pseudo terminal slave device, wherein the list of open pseudo terminal slave devices allows pseudo terminal master devices and pseudo terminal slave devices associated with the pseudo terminal streams to be restarted in a random order; and
computer usable program code for calling network services to write a state of the socket into a data structure in a pseudo terminal stream in the pseudo terminal streams being restarted in response to identifying the device as a socket associated with a pseudo terminal device, wherein information in the checkpoint data describes the state of the socket, a correct pseudo terminal master device, and a pseudo terminal slave device pair associated with the socket.

11. The computer program product of claim 10 further comprising:
computer usable program code for creating a set of dummy entries in the list of open pseudo terminal slave devices in response to identifying a set of unopened pseudo terminal slave devices that are to be opened before the identified pseudo terminal slave device is opened, wherein each dummy entry represents an unopened pseudo terminal slave device in the set of unopened pseudo terminal slave devices.

12. The computer program product of claim 10 further comprising:
computer usable program code for creating a module for a pseudo terminal master device that is being restarted in response to identifying the device as the pseudo terminal master device, wherein the module comprises a module queue internal structure.

13. The computer program product of claim 10 further comprising:
computer usable program code for scanning the list of open pseudo terminal slave devices for an entry identifying a pseudo terminal slave device corresponding to a pseudo terminal master device to form a corresponding pseudo terminal slave device in response to receiving a restart command by the pseudo terminal master device in the pseudo terminal streams; and
computer usable program code for copying internal checkpoint data for the pseudo terminal master device to a module in the pseudo terminal streams representing the pseudo terminal master device in response to finding the entry identifying the corresponding pseudo terminal slave device in the list of open pseudo terminal slave devices.

14. The computer program product of claim 13 further comprising:
computer usable program code for placing the pseudo terminal master device in a wait queue in response to determining that an entry identifying the corresponding pseudo terminal slave device is not present in the list of open pseudo terminal slave devices.

15. The computer program product of claim 10 further comprising:
computer usable program code for scanning a wait queue for a pseudo terminal master device corresponding to a pseudo terminal slave device to form a corresponding pseudo terminal master device in response to receiving a restart command by the pseudo terminal slave device; and
computer usable program code for removing the pseudo terminal master device from the wait queue and copying internal checkpoint data for the pseudo terminal slave device to a module in the pseudo terminal streams representing the pseudo terminal slave device in response to finding the entry identifying the corresponding pseudo terminal master device in the wait queue.

16. An apparatus comprising:
a bus system;
a communications system coupled to the bus system;
a memory connected to the bus system, wherein the memory includes computer usable program code; and
a processing unit coupled to the bus system, wherein the processing unit executes the computer usable program code to open a device associated with a file descriptor in a set of file descriptors identified in checkpoint data for restarting the pseudo terminal streams; add an entry for an identified pseudo terminal slave device to a list of open pseudo terminal slave devices in response to identifying the device as a pseudo terminal slave device to form the identified pseudo terminal slave device; mark the entry for the identified pseudo terminal slave device as an open pseudo terminal slave device, wherein the list of open pseudo terminal slave devices allows pseudo terminal master devices and pseudo terminal slave devices associated with the pseudo terminal streams to be restarted in a random order; and call network services to write a state of the socket into a data structure in a pseudo terminal stream in the pseudo terminal streams being restarted in response to identifying the device as a socket associated with a pseudo terminal device, wherein information in the checkpoint data describes the state of the socket, a correct pseudo terminal master device, and a pseudo terminal slave device pair associated with the socket.

17. The apparatus of claim 16 wherein the processor unit further executes the computer usable program code to create a module representing a pseudo terminal master device in a pseudo terminal stream in the pseudo terminal streams being restarted in response to identifying the device as a pseudo terminal master device, wherein the module comprises a module queue internal structure.

18. The apparatus of claim 16, wherein the processor unit further executes the computer usable program code to scan the list of open pseudo terminal slave devices for an entry identifying a pseudo terminal slave device corresponding to a pseudo terminal master device to form a corresponding pseudo terminal slave device in response to receiving a restart command, by the pseudo terminal master device copy internal checkpoint data for the pseudo terminal master device to a module in the pseudo terminal streams representing the pseudo terminal master device in response to finding the entry identifying the corresponding pseudo terminal slave device in the list of open pseudo terminal slave devices.

19. The apparatus of claim 18, wherein the processor unit further executes the computer usable program code to place the pseudo terminal master device in a wait queue in response to determining that an entry identifying the corresponding pseudo terminal slave device is not present in the list of open pseudo terminal slave devices.

20. The apparatus of claim 16, wherein the processor unit further executes the computer usable program code to create a set of dummy entries in the list of open pseudo terminal slave devices in response to identifying a set of unopened pseudo terminal slave devices that are to be opened before the identified pseudo terminal slave device is opened, wherein each dummy entry represents an unopened pseudo terminal slave device in the set of unopened pseudo terminal slave devices.

* * * * *